(12) United States Patent
Shiraishi

(10) Patent No.: US 7,124,516 B2
(45) Date of Patent: Oct. 24, 2006

(54) DEVICE FOR REMOVING WATER DROPS FROM AN UMBRELLA AND FOUNDATION PROMOTION SYSTEM OF THE DEVICE

(76) Inventor: Yoshinori Shiraishi, c/o, Hinode Co., Ltd., 21-5, Naka 2-Chome, Hakata-Ku, Fukuoka-Shi, Fukuoka (JP)

( * ) Notice: Subject to any disclaimer, the term of this patent is extended or adjusted under 35 U.S.C. 154(b) by 0 days.

(21) Appl. No.: 10/518,353

(22) PCT Filed: Jun. 20, 2003

(86) PCT No.: PCT/JP03/07897

§ 371 (c)(1),
(2), (4) Date: Dec. 17, 2004

(87) PCT Pub. No.: WO04/001307

PCT Pub. Date: Dec. 31, 2003

(65) Prior Publication Data

US 2005/0222880 A1     Oct. 6, 2005

(30) Foreign Application Priority Data

Jun. 21, 2002   (JP)   ............................. 2002-180916

(51) Int. Cl.
*F26B 25/00*   (2006.01)
(52) U.S. Cl. ............................. 34/103; 34/107; 34/202; 705/14
(58) Field of Classification Search .................. 34/103, 34/107, 202; 705/14
See application file for complete search history.

(56) References Cited

U.S. PATENT DOCUMENTS

| 1,476,599 | A | * | 12/1923 | De Witt | ........................ 211/62 |
| 1,955,436 | A | * | 4/1934 | Mott | ............................. 34/95 |
| 3,136,426 | A | * | 6/1964 | Sakuma | ........................ 211/62 |
| 5,261,541 | A | * | 11/1993 | Li | ................................ 211/62 |
| 5,625,960 | A | * | 5/1997 | Fujita | ............................. 34/80 |
| 5,938,049 | A | * | 8/1999 | Susholz | ........................ 211/62 |
| 6,655,399 | B1 | * | 12/2003 | Williams | ................... 135/34.2 |

FOREIGN PATENT DOCUMENTS

| JP | 05-083687 U | 11/1993 |
| JP | 6-109362 | * 4/1994 | ............... 34/179 X |

(Continued)

*Primary Examiner*—S. Gravini
(74) *Attorney, Agent, or Firm*—Rader, Fishman & Grauer PLLC; Ronald P. Kananen

(57) ABSTRACT

The device for removing water drops from an umbrella is constituted such that a number of water absorption members with elastic property are disposed at certain intervals radially in the inserting opening for an umbrella of the device body, the inserting space for the umbrella is in the central part of a number of water absorption members, thereby a closed rainy umbrella is inserted into the inserting space, the umbrella cloth is inserted into the clearance between the each adjacent water absorption member, then water drops on the umbrella cloth can be absorbed and removed by sliding the inserted umbrella in the direction of insertion of the umbrella, the device does not need such energy as electric energy, and water absorption is performed certainly and within only short time. In the device foundation promotion system the server which is connected preferably to a network performs processing of device foundation owner recruitment and advertiser recruitment on the device with advertisement, processing of acceptance of proposal of device foundation owner and advertiser, and processing transmittance of information necessary for the real device manager and promotes foundation of the device for removing water drops effectively and spreads the device.

14 Claims, 28 Drawing Sheets

FOREIGN PATENT DOCUMENTS

| | | |
|---|---|---|
| JP | 2000-083791 | 3/2000 |
| JP | 2001-280841 | 10/2001 |
| JP | 2001-289559 | 10/2001 |
| JP | 2001 289559 * | 10/2001 |
| JP | 2002 028064 * | 1/2002 |
| JP | 2002-123750 | 4/2002 |
| JP | 2002-168562 | 6/2002 |
| JP | 2003-016297 | 2/2003 |

* cited by examiner

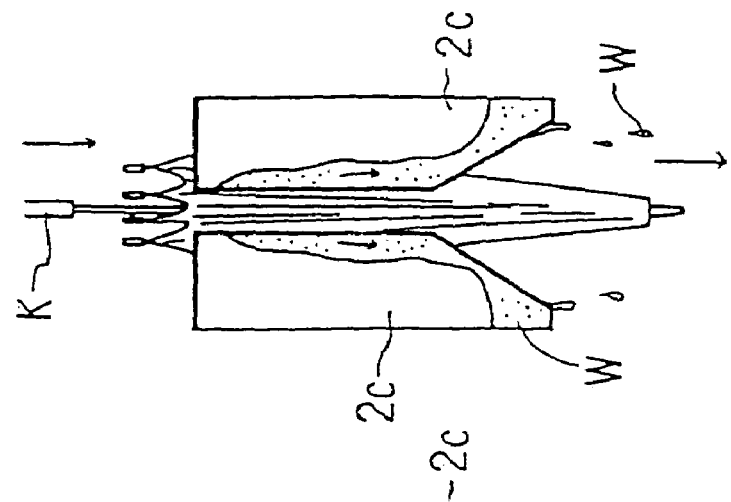
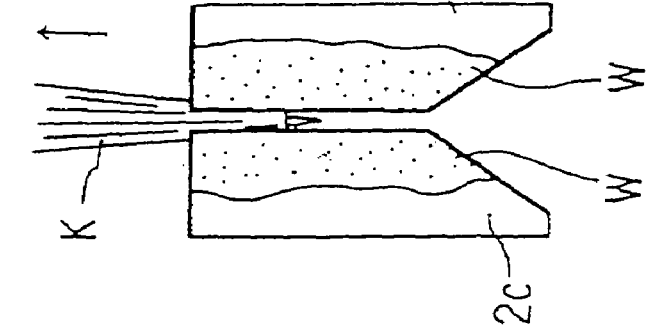
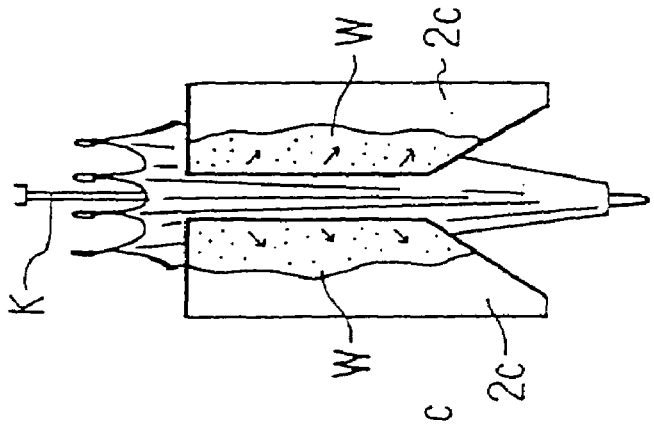
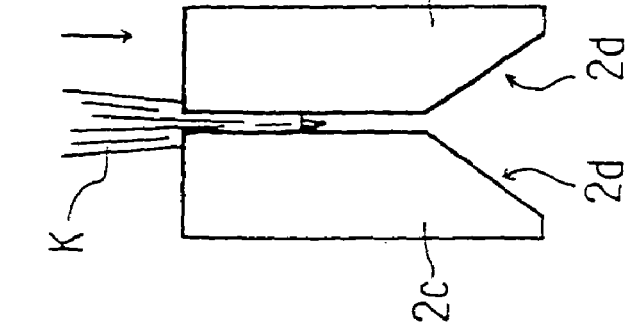

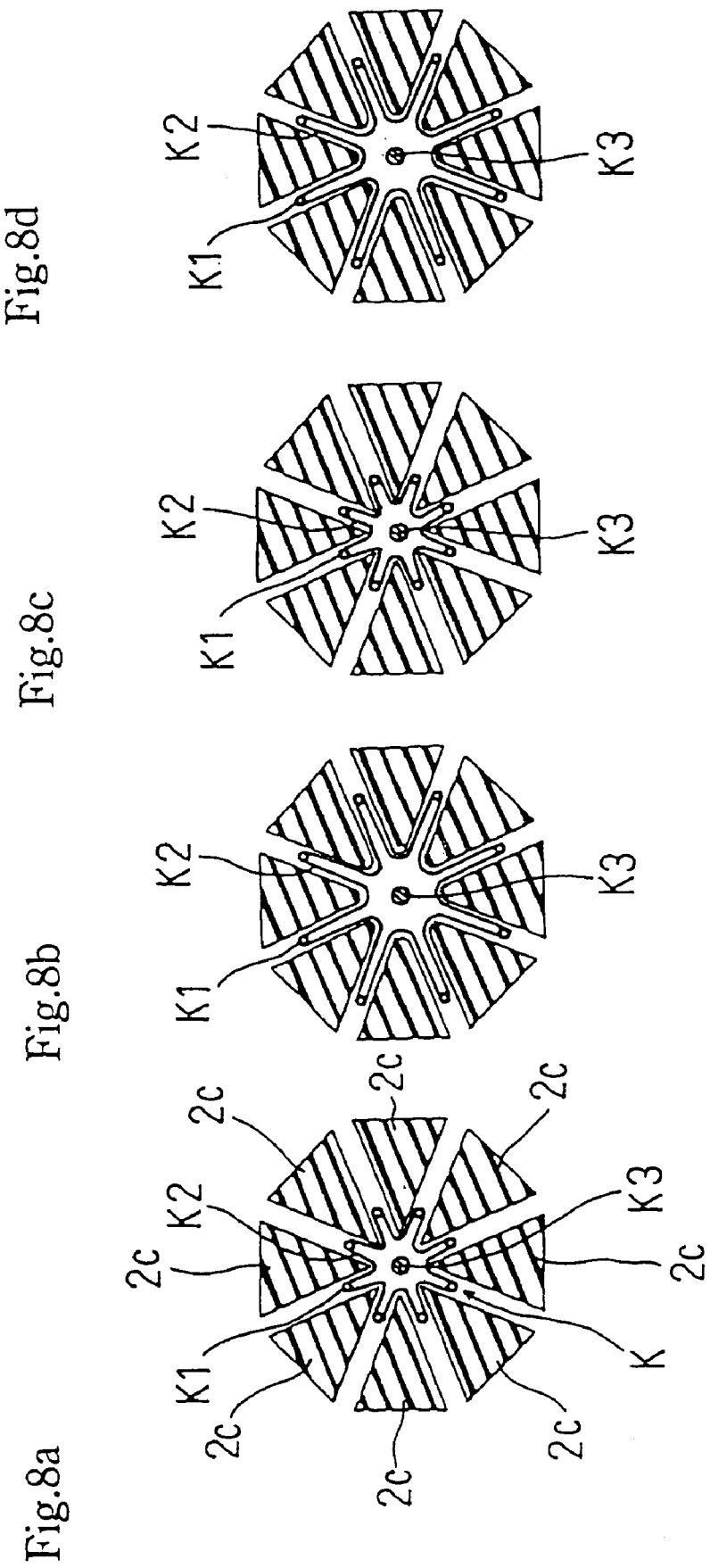

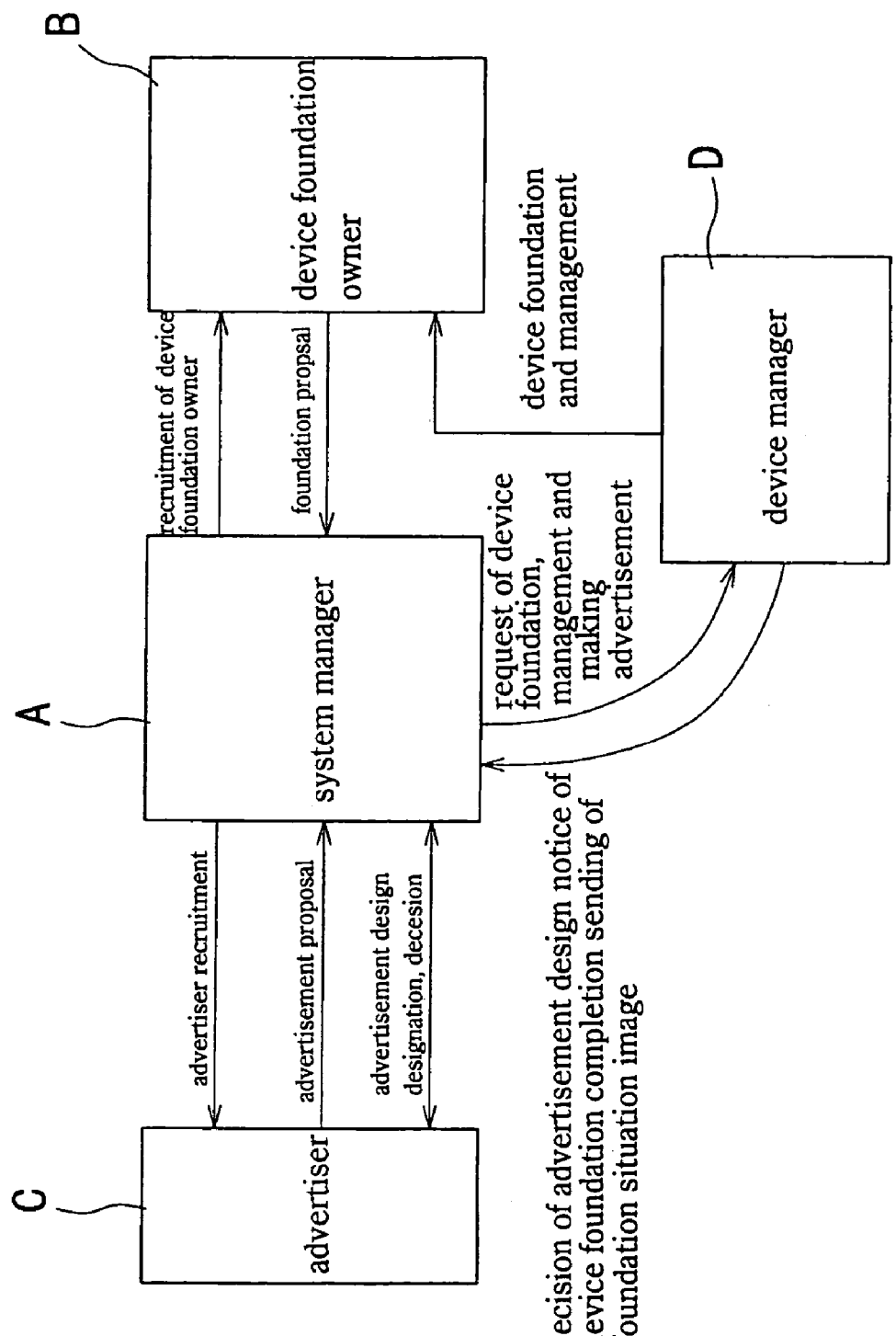

Fig.27 screen

∗ ABC system management company

Let's cut down vinyl jacket for receiving water drop of umbrella as industrial waste ☐ You can found a device for removing water drop of umbrella without fee foundation conditions
 * company, institution public building in which persons more than fifty per day go in and out
 * juristic person who can keep the device more than one year
 * advertisement is carried on the device

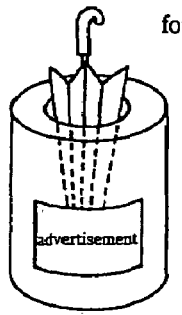

foundation proposal without a fee
*proposer  name              ☐☐☐☐☐☐☐ address           ☐☐☐☐, ☐☐☐☐☐, ☐☐☐☐☐☐ mail address       ☐☐☐☐☐☐☐ building name      ☐☐☐☐☐☐☐ address           ☐☐☐☐, ☐☐☐☐☐, ☐☐☐☐☐☐ number of device to be founded   ☐☐☐ sending button

S1

DEVICE FOR REMOVING WATER DROPS FROM AN UMBRELLA AND FOUNDATION PROMOTION SYSTEM OF THE DEVICE

BACKGROUND OF THE INVENTION

1. Field of Invention

The invention relates to a device for absorbing water drops from an umbrella and device foundation promotion system for promoting foundation of said device by interaction of information through network.

2. Description of the Related Art

Conventionally in such a building as a public institution and a store etc., a rainy umbrella under rainy weather is stood in a umbrella stand disposed in the gateway of the building, or is covered by a vinyl jacket in order to prohibit water drops from falling off the umbrella and on the ground in the building. Since useless expense is required because of trashing the vinyl jacket after only one use, now a device is utilized for drying a rainy umbrella compulsively by means of hot air flow or a device for throwing off water drops under centrifugal force by compulsory rotation of the umbrella. However since these devices are complex, have high cost, require energy such as electric power and so forth, and require much time for removing water drops, these devices are not widespread.

SUMMARY OF THE INVENTION

The invention is created in order to resolve the above problems, and the object of this invention lies in presentation of a device for removing water drops from an umbrella which has a simple construction and does not need such energy as electric power and so forth and can keep water absorbency constant and a foundation promotion system which is to promote and spread foundation of this device effectively.

DISCLOSURE OF INVENTION

The device for removing water drops from an umbrella is constituted such that a number of elastic water absorption members at certain intervals among these members are arranged radially at the opening for inserting the umbrella of the body member so as to provide clearance, in the center portion of the radially arranged water absorption members is disposed a space for inserting the umbrella, thereby the rainy umbrella is inserted through the inserting opening of the device body into the insertion space so that an umbrella cloth is inserted into the clearance between each water absorption member, waterdrops on the umbrella cloth are absorbed into each water absorption member by moving the umbrella along the direction of insertion of the umbrella, by repeating these operations water drops on the whole umbrella cloth are removed while water in the water absorption members falls down and is squeezed because each water absorbed member is compressed and deformed during insertion of the next umbrella water absorption performance is not saturated and water absorbency is kept at a certain level.

Furthermore, the device for removing water drops in accordance with the invention of this application is constituted on demands such that each water absorption member is constructed in which each pillar with a triangle section of foam material is attached to a hard reinforcement plate, water absorption member of excellent water absorbency is achieved with low cost, while maintenance property for the exchange etc. is increased by using foam material attachably and detachably to the reinforcement plate.

Furthermore, the device for removing waterdrop in accordance with the invention of this application is constituted on demands such that each water absorption member is constructed in which the surface of the elastic pillars triangular in section is covered by a cloth of double construction with a nit on the surface layer and a soft sheet with water-transmittance property on the back surface layer, said elastic pillar is installed on the hard reinforcement plate attachably and detachably, thereby absorbed water is stored and discharged smoothly by that the cloth of double construction with a nit on the surface of the elastic member and with a soft sheet of water transmittance property on the back surface is used. Consequently, a water absorption member with excellent water absorbency is achieved, maintenance property of exchange and so forth is increased because said elastic pillars are installed to the reinforcement plate attachably and detachably.

Furthermore, the device for removing water drops from an umbrella in accordance with the invention of this application is constituted on demands such that each water absorption member is constructed in which the surface of the elastic pillar is covered by a cloth of double construction with a nit on the surface and a water transmittance soft sheet on the back surface and said elastic pillar is installed to the hard reinforcement plate attachably and detachably, water volume absorbed by the nit is stored so as not to come back to the umbrella cloth and can be drained rapidly owing to providing cloth with said construction on the surface of the elastic pillar, thereby a water absorption member with excellent water absorbency is achieved, and maintenance property of exchange and so forth is increased because said elastic member is installed to the reinforcement plate attachably and detachably.

Furthermore, the device for removing water drops from an umbrella in accordance with the invention of this application is constituted on demands such that the lower side of the inserting space of the umbrella of each water absorption member is cut with an inclined surface toward to back surface side of the water absorption member so as to spread the interval in the lower range of umbrella insertion space downward and water volume absorbed by water absorption member is discharged downward so as not to touch the top of the umbrella with said absorbed water by making the top of the umbrella not touch the lower portion of the insertion space for the umbrella of each water absorption member.

Furthermore, device for removing water drops from an umbrella is constituted on demands such that each water absorption member is radially arranged and connected to another by an annular frame, during insertion of the umbrella into the insertion space, spreading of clearance between each water absorption member is prevented consequently water absorbency can be kept at a certain level.

Furthermore, the device for removing water drops from an umbrella is constituted on demands such that during drawing off the umbrella which is inserted into the space between each water absorption member, guides for preventing the umbrella cloth to be disturbed by the annular frame are provided, the umbrella cloth is not disturbed by the annular frame because the guide prevents the umbrella cloth from touching the annular frame, and a large umbrella can be moved smoothly and water drops can be absorbed effectively.

Furthermore, the device for removing water drops from an umbrella is constituted on demands such that a number of notches are formed at the corner portion of each water absorption member in the insertion space side along the direction of insertion at a number of positions with certain intervals, during insertion and motion of the umbrella, said water absorption members are easily deformed and allow the umbrella to move smoothly.

Furthermore, the device for removing water drops from an umbrella is constituted on demands such that a drainage pipe with numerous bores in a water absorption member is arranged so as to expose its end on the lower surface of water absorption member or on the back surface, so that absorbed water drops are gathered through numerous bores into the drainage pipe and said water drops are discharged steadily and water retainability of the water absorption member is kept constant.

Furthermore, the device for removing water drops from an umbrella is constituted on demands such that a number of water absorption rollers are radially arranged so as to surround the inserted umbrella below the water absorption member, and a pushing member which is adapted to squeeze each said water absorbed rollers so as to squeeze the absorbed water is disposed, thereby by water absorption by means of the water absorption rollers and simultaneously squeezing said water absorption rollers water absorbency of the water absorption rollers is kept constant and can absorb water from the top of the umbrella.

Furthermore, the device for removing water drops from an umbrella is constituted on demands such that below the water absorption member is disposed a water pan for storing absorbed water in the manner that said water pan can be inserted in the device and taken out of the device, and water stored in the water pan can be discharged outside of the devices when water of a certain volume is stored in the water pan.

Furthermore, the device for removing water drops from an umbrella is constituted on demands such that a shoot which guides water stored above the water pan into the water pan thereby absorbed water is stored in the water pan.

Furthermore, a foundation promotion system of the device for removing water drops from an umbrella in accordance with the invention of this application is constituted so as to provide a server which offers a service for making a home page including predetermined contents through a predetermined network readable and a number of clients who make said home page through said network readable, thereby said system performs such program that the server is provided with a processing section of foundation owner recruitment which displays such contents on the home page as each content of explanation of foundation and enterprise management of the device for removing water drops from an umbrella with an advertisement and foundation proposer recruitment of said device together with an input column of foundation proposal information; a processing section of foundation proposal acceptance which receives and memories the foundation proposal information sent from the client of the foundation proposer through input information of the foundation proposal information of said device; a processing section of advertiser recruitment which displays such contents on the home page as content that it recruits an advertiser who advertises on the device for removing water drops from an umbrella which a foundation proposer intends to found together with an input column of advertisement proposal information; a processing section of advertisement proposal acceptance which receives and memorizes advertisement proposal information sent from the client of the advertiser through inputting into input column of said advertisement proposal information; a processing section of proposal information transmittance which sends necessary information for designation of foundation and management of the device for removing water drops from an umbrella to the client of the device manager who founds and manages said device for removing water drops from an umbrella when foundation of said device for removing water drops from an umbrella owing to foundation proposal of said device and advertisement proposal in accordance with said foundation proposal is possible. Thus in accordance with the invention of this application, vinyl jacket use, which vinyl jackets are trashed after use, is reduced and circumstance load is reduced in accordance with foundation promotion of the device for removing water drops from an umbrella owing to carrying an advertisement and spreading the device for removing water drops from an umbrella.

Furthermore, the foundation promotion system of the device for removing water drops from an umbrella in accordance with the invention of this application is constituted on demands such that in the steps of processing of said proposal information transmittance, in the information to be sent to a device manager, each designation of advertisement draft design and making advertisement on the outer surface of the device for removing water drops from an umbrella are contained and on demands of the advertiser the device manager makes the advertisement preferably and the advertisement can be installed on the device to be founded rapidly.

BRIEF EXPLANATION OF THE DRAWINGS

FIG. 7, consisting of FIGS. 7a through 7d, is an illustration showing each water absorption step of the water drops in the device for removing water drops from an umbrella in accordance with the first embodiment of the invention of this application.

FIG. 8, consisting of FIGS. 8a through 8d, is a lateral sectional view of a water absorption member during each water absorption step of the device for removing water drops from an umbrella in accordance with the first embodiment of the invention of this application.

FIG. 26 is an illustration of the commercial trading embodiment of the foundation promotion system of the device for removing water drops from an umbrella in accordance with the fifth embodiment of the invention of this application.

FIG. 27 is an illustration of a display screen of contents of a foundation owner recruit of the foundation promotion system of the device for removing water drops in accordance with the fifth embodiment of the invention of this application.

Figure 1:
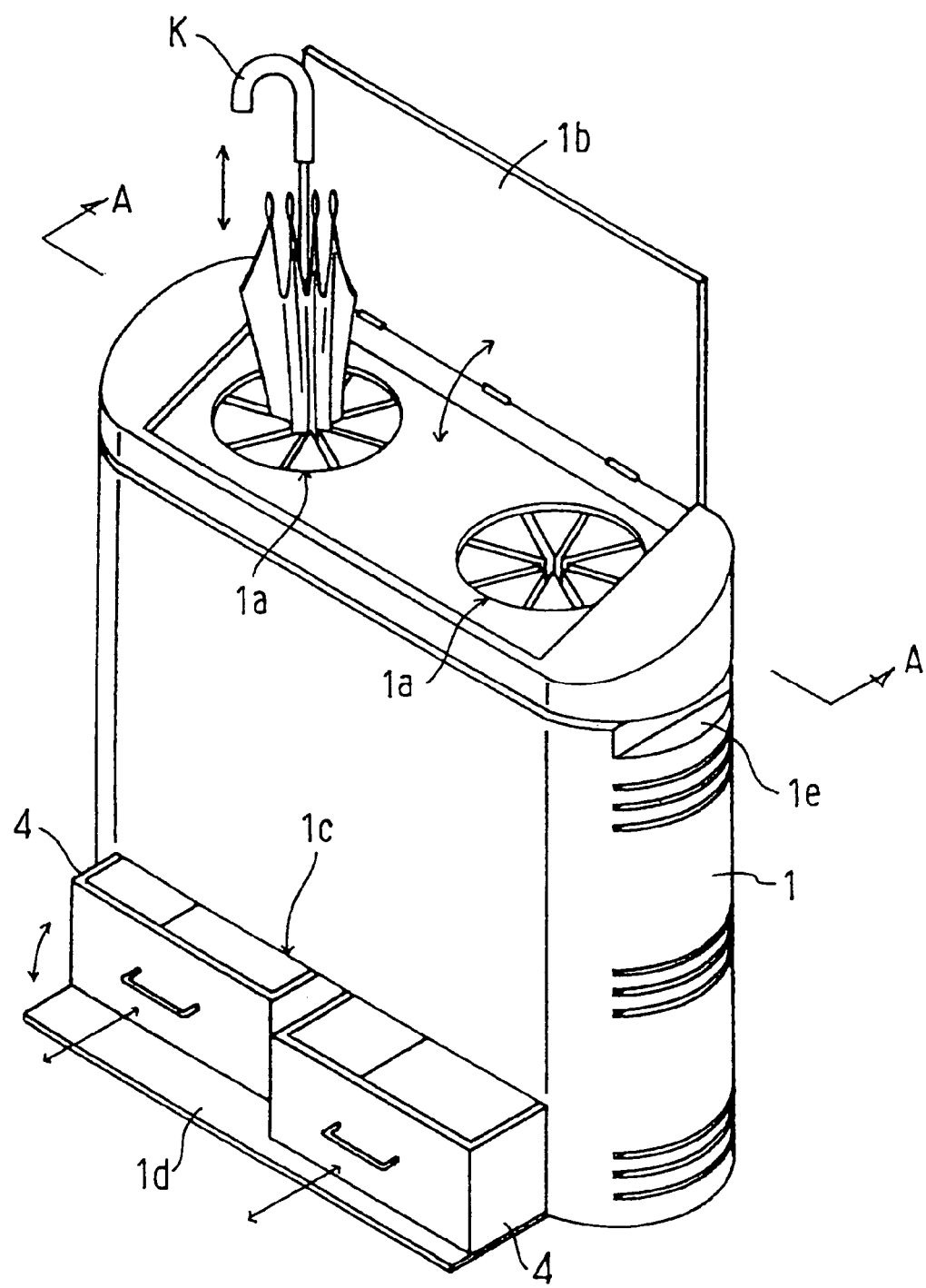
FIG. 1 is a perspective view of a device for removing water drops from an umbrella in accordance of the invention of this application.

NUMERALS 1 device body
1a opening
1b cover
1c opening
2 water absorption part
2a upper frame
2b lower frame
2c elastic member
2d inclined portion
2e knit
2f soft fluorine resin sheet
2g silicon adhesive
2h cloth
2i enforcement plate
2j installing member
2k absorption member
3 shoot
4 water pan
5 drainage pipe
6 lower water absorption portion
6a bore
7 L-shaped guide
7a upper frame
7b lower frame
7c supporting column
7d water absorption roller
7e pushing member
10 network
20 server for system provider A
21 CPU
22 HDD
23 display
24 keyboard
25 Mouse
26 ROM
27 RAM
28 network interface
30 client of device foundation owner B
40 client of advertiser C
50 client of device manager D
HP home page
P1 processing section of foundation owner recruitment display
P2 processing section of foundation proposal acceptance
P3 processing section of advertiser recruitment display
P4 processing section of advertisement proposal acceptance
P5 processing section of proposal information transmission
P0 basic processing section
S1 sending button
S2 proposal button

DESCRIPTION OF THE PREFERRED EMBODIMENTS

Best Mode of Executing the Invention (The First Embodiment)

A Device for removing water drops from an umbrella in accordance with a first embodiment of the invention of this application is explained on the basis of FIG. 1~8 as follows.

In accordance with this embodiment as an example of a device for removing water drops from an umbrella, 8 water absorption members with triangle in section are arranged radially in the device body having two openings for insertion of an umbrella.

Figure 2:
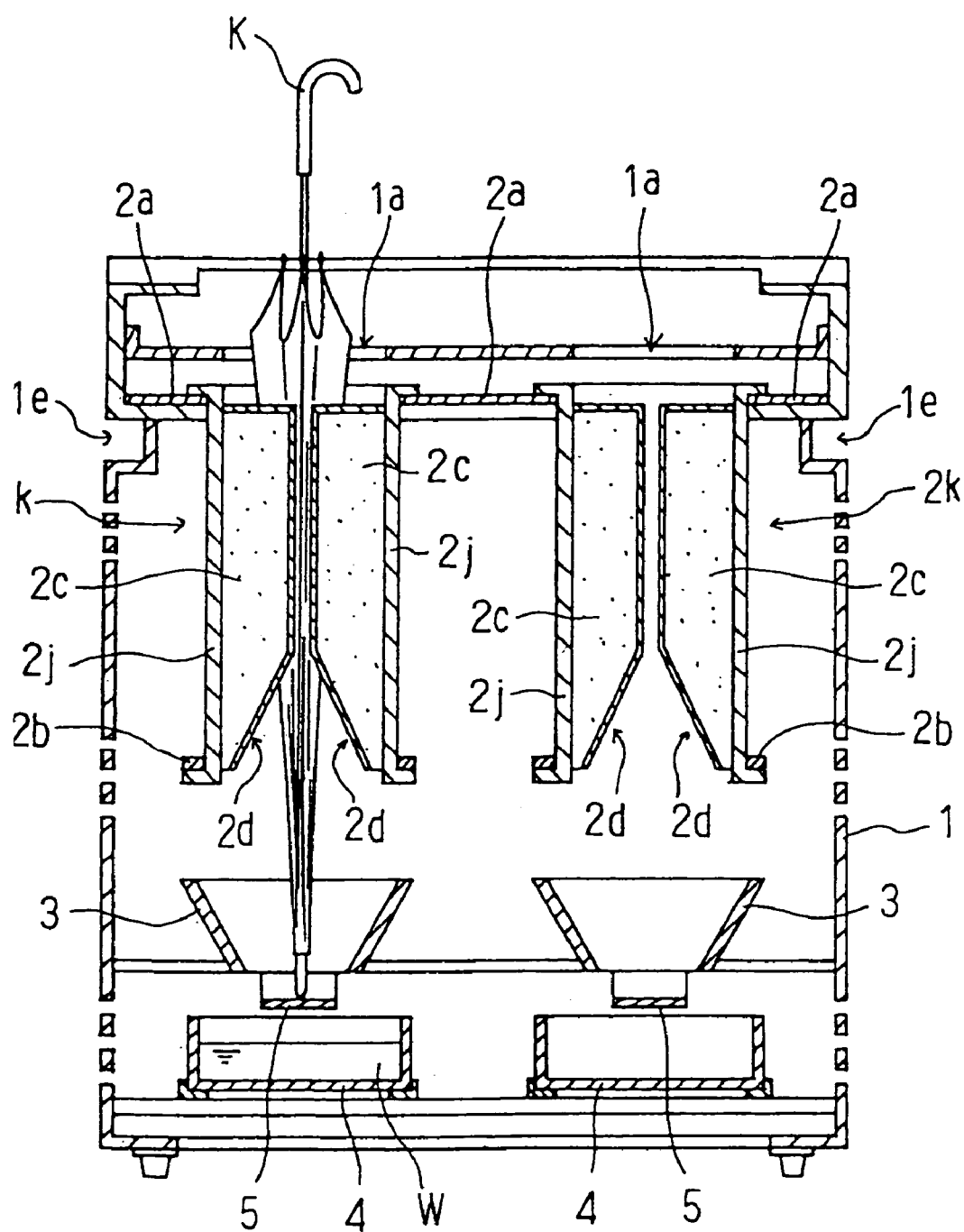
FIG. 2 is a sectional view looking along the line A—A in FIG. 1.
Figure 3:
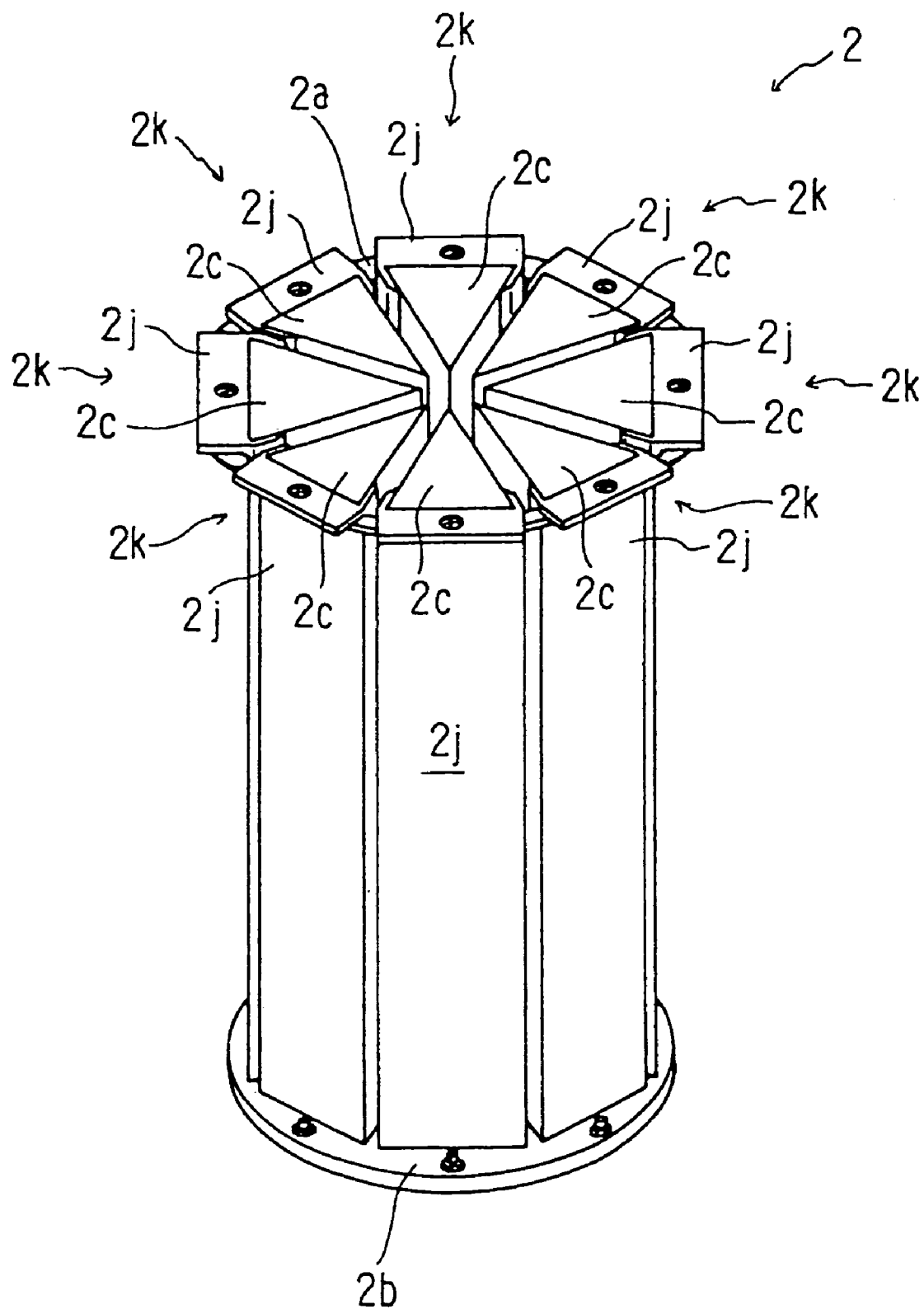
FIG. 3 is a perspective view of the water absorption part of the device for removing water drops from an umbrella in accordance with the first embodiment of the invention of this application.
Figure 4:
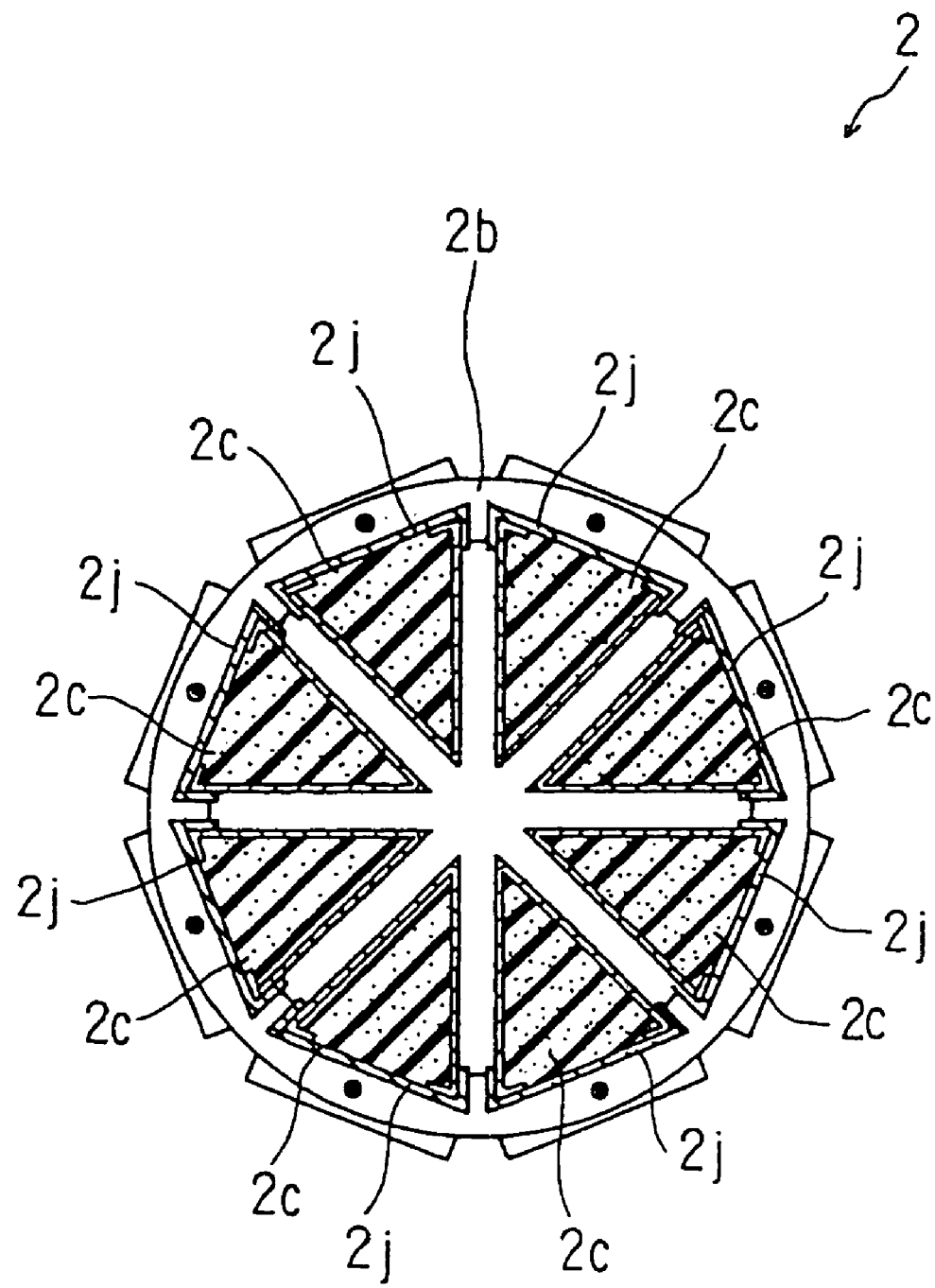
FIG. 4 is a lateral sectional view of water absorption part of the device for removing water drops from an umbrella in accordance with the first embodiment of the invention of this application.
Figure 5:
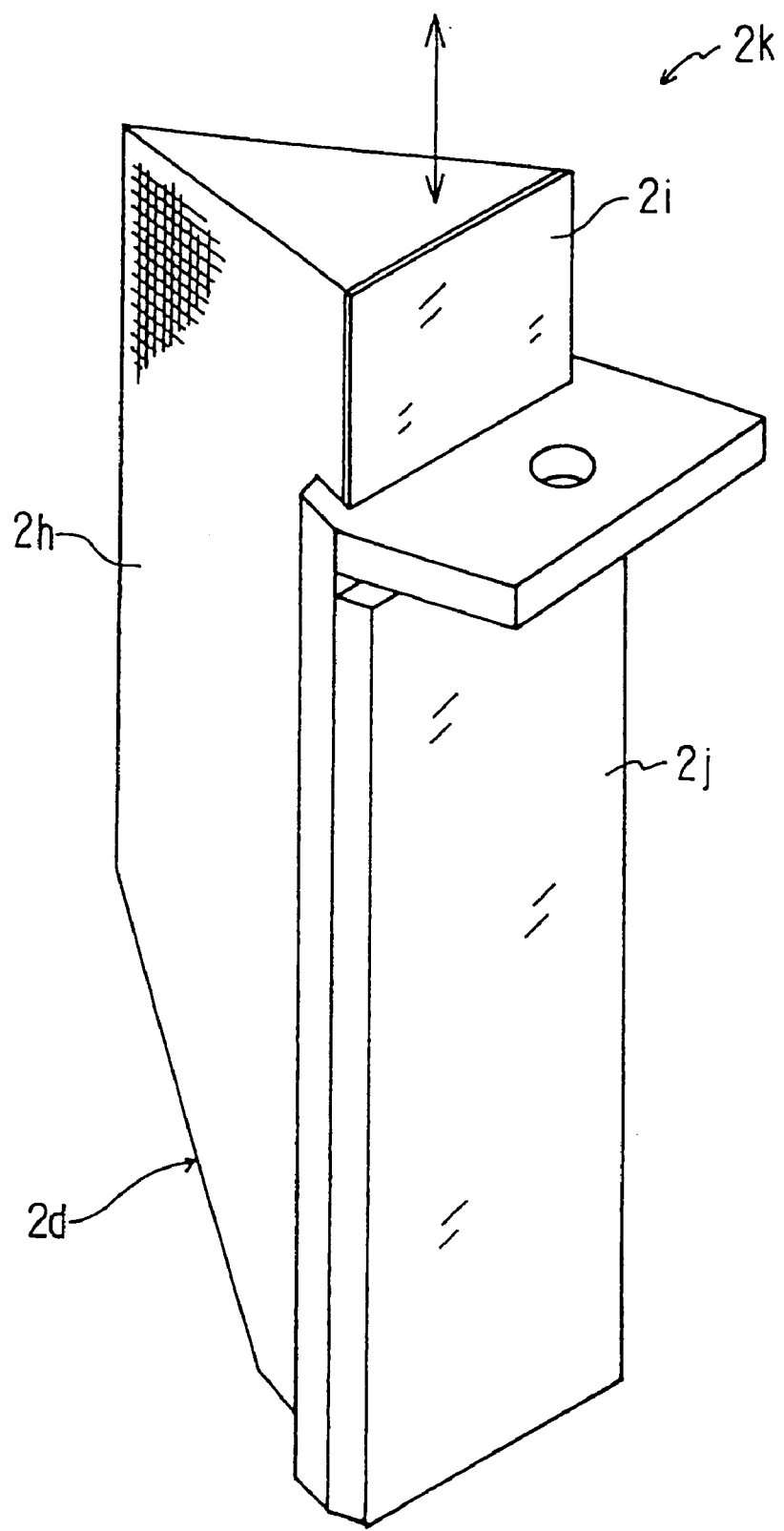
FIG. 5 is a perspective view of the water absorption member of the device for removing water drops of the umbrella in accordance with the first embodiment of the invention of this application.
Figure 6:
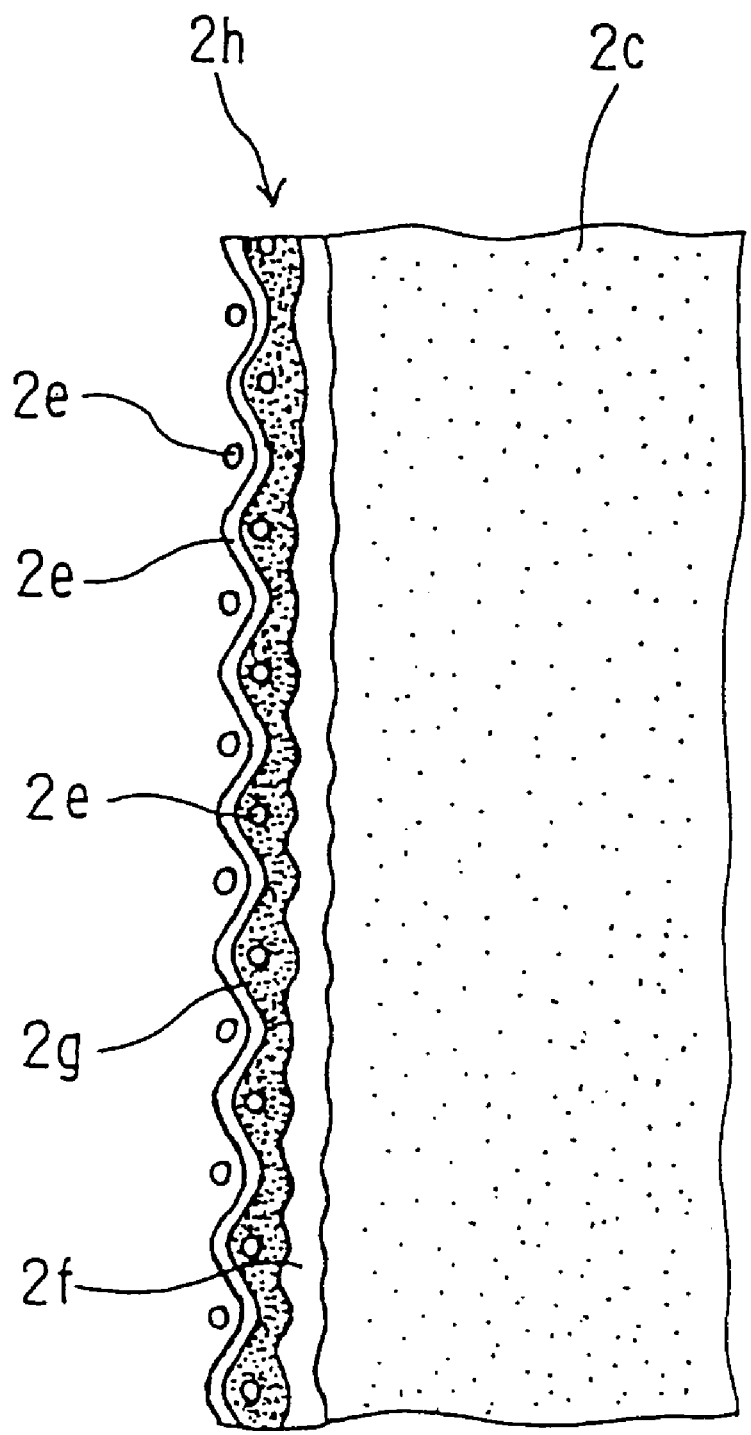
FIG. 6 is a sectional view of the cloth of the device for removing water drops from an umbrella in accordance with the first embodiment of the invention of this application.

FIG. 1 is a perspective view of the device for removing water drops from an umbrella in accordance with the first embodiment of the invention, FIG. 2 is a sectional view looking along the line A—A in FIG. 1, FIG. 3 is a perspective view of a water absorption part of the device for removing water drops from an umbrella in accordance with the first embodiment of the invention, FIG. 4 is a lateral sectional view of the water absorption part of the device for removing water drops from an umbrella in accordance with the first embodiment of the invention, FIG. 5 is a perspective view of a water absorption member of the device for removing water drops from an umbrella in accordance with the first embodiment of the invention, FIG. 6 is a sectional view of a cloth of the device for removing water drops from an umbrella in accordance with the first embodiment, FIG. 7 is an illustration showing each step of absorption of water drops in the device for removing water drops from an umbrella in accordance with the first embodiment of the invention, and FIG. 8 is a lateral sectional view of the water absorption member showing each step of absorption of water drops in the device for removing water drops from an umbrella in accordance with the first embodiment of the invention.

As shown in each drawing, in the device for removing water drops from an umbrella in accordance with the first embodiment two water absorption parts 2 are disposed in a device body 1 having two openings for inserting umbrellas.

The device body 1 is provided with two round openings 1a for inserting umbrella on the top surface, a cover 1b for opening and shutting which is adapted to shut the opening 1a during no use is disposed openably and shuttably. The front lower portion of the device body 1 provides two openings 1c, a cover 1d for shutting the opening 1c is disposed openably and shuttably, and a grip 1e is disposed at the above portion of both sides of the device body 1.

The water absorption parts 2 is constructed such that water absorption members 2k are so arranged radially in number which corresponds to the number of umbrella ribs (in FIG. 8; 8 ribs ) that space for inserting an umbrella in the central portion is formed by separating one water absorption member 2k with triangle sections from the adjacent other water absorption member 2k. about 5~6 mm, and the water absorption members 2k are connected integrally by an annular upper frame 2a and an annular lower frame 2b so that clearance between adjacent water absorption members 2k does not spread when an umbrella is inserted. Two of the water absorption parts 2 are hung by the upper frame 2a below the opening 1a of the device body 1. The water absorption member 2k is constructed such that a pillar shaped elastic member 2c with a triangle section made of foam polyethylene with continuous foams, foam urethane, foam gum and so forth is cut at the lower portion in order to form an inclined surface 2d, cloth 2h (for example; alumina (trade mark of limited corporation TO-RE company)) constructed by adhering a nit 2e through the silicon adhesive agent 2g on the surface of the soft fluorine resin sheet covers the surface including the inclined surface 2d of the elastic member 2c, an elastic member 2c and a reinforcement plate 2i made of plastic material are adhered by curing the end portion on the back surface of the elastic member 2c, the thus constructed member is secured attachably and detachably to the installing member 2j.

As a member for securing water absorption member 2k to each frame, a metal such as stainless steel and so forth, plastic and hard gum and so forth are used to prevent rusting, in use of gum, gum may be secured by means of a belt material because of the reduction of water absorbency owing to deforming outwardly during insertion of the umbrella.

As a water absorption-member 2k, only foam material having continuous foams such as foam polyethylene and foam urethane, foam gum and so forth having low cost and superior water absorbency can be used. In this case, it may be considered that foam material is assembled to the hard reinforcement plate attachably and detachably in order to increase such maintenance property as exchanging and so forth.

Besides this water absorption part 2, there are arranged a funnel-shaped shoot 3 for guiding absorbed water to a water pan, the water pan for storing water guided by the shoot 3 and a stopper 5 for preventing the umbrella from over insertion.

At the lower portion of the body member 1 is disposed the water pan for storing water which can be inserted into or taken out of the device body, but maintenance property can be increased by always draining water outside of the member 1 by means of drainage pipe.

Next, water absorption step in the device for removing waterdrop in accordance with the first embodiment is explained. A rainy umbrella is closed and inserted into the opening 1a, and as shown in FIG. 7(a),(b) and FIG. 8(a),(b), the umbrella is inserted gradually so that the umbrella ribs K1 and a umbrella cloth K2 are inserted in the clearances between each water absorption member, and then the umbrella K is slid upward and downward.

Water drops are caught in the nit 2e of the cloth 2h, and some of the water drops are absorbed through the soft fluorine resin sheet 2f in the elastic member 2c, caught water W flows in the inclined portion through the clearance between the nit 2e and the soft fluorine resin sheet 2f, and the water drops are not only prevented from coming back to the umbrella cloth K2 but they also are drained downward.

We repeat the explanation of the water absorption steps shortly, absorbed water is stored inside of each water absorption member 2k, then water absorption is not effected when water absorbency is saturated. But, as shown in FIG. 7(d), absorbed water is squeezed out of the lower end of the water absorption member and certain water absorbency can be kept without reaching saturation conditions by deforming and pressing each water absorption member during insertion of umbrella.

Thus water drops on the surface of the umbrella k2 are removed by sliding oscillation of the umbrella twice or thrice, squeezed water is guided and gathered in the water pan 4 through shoots 3 below the opening and the water pan is emptied by taking the water pan out of the member 1 when a certain volume of water is stored in the water pan.

The device for removing water drops from an umbrella in accordance with the first embodiment of the invention can absorb water drops exceedingly simply and absorb surely within a short time by only moving umbrella upward and downward several times after inserting a rainy umbrella into the opening 1a of the member 1. Furthermore, the device does not need such energies as electric energy and so forth, has simple construction, damages are prevented, maintenance is simple and has low cost.

Figure 9:
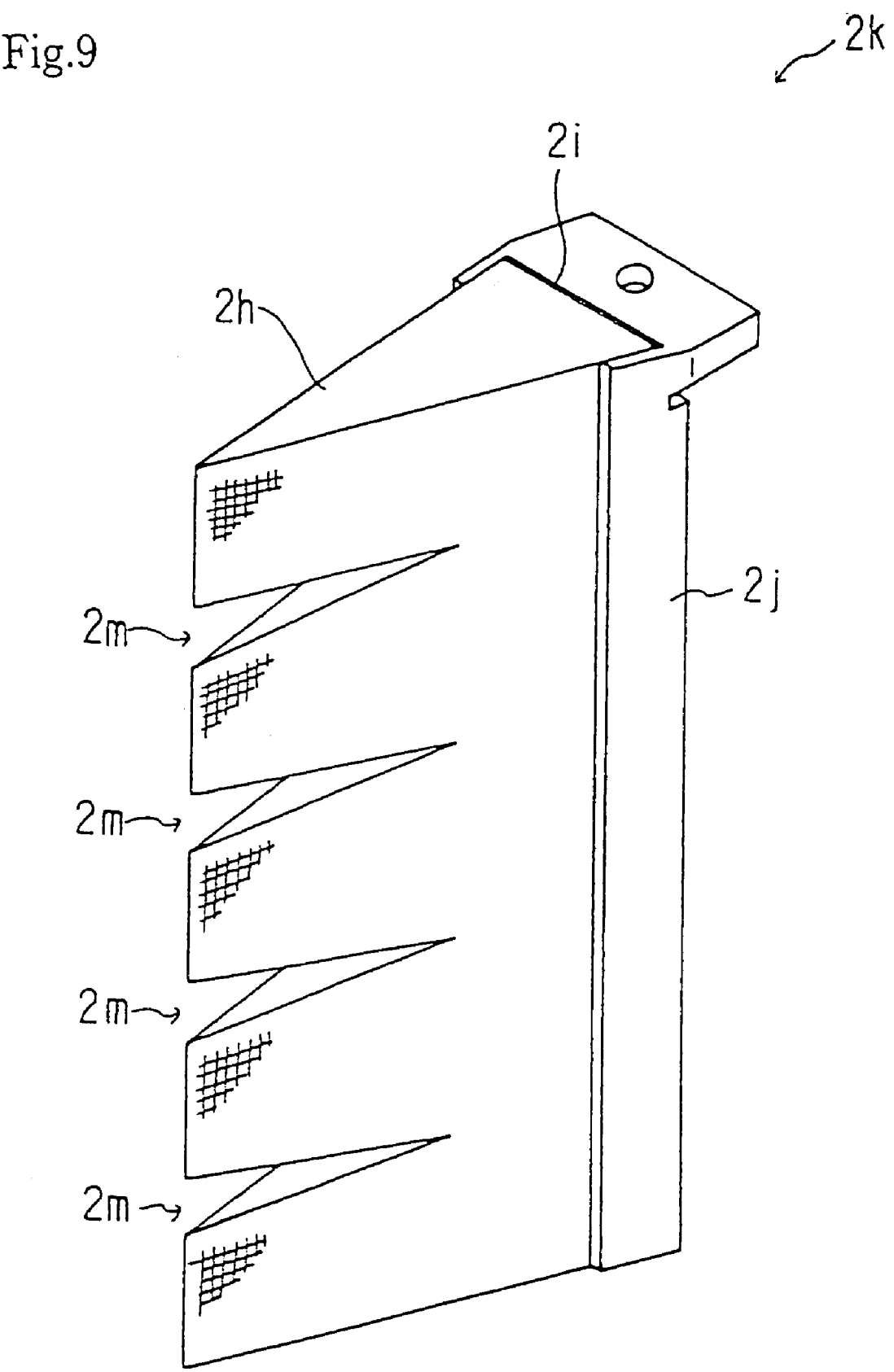
FIG. 9 is a perspective view of another water absorption member of the device for removing water drops from an umbrella in accordance with the invention of this application.
Figure 10:
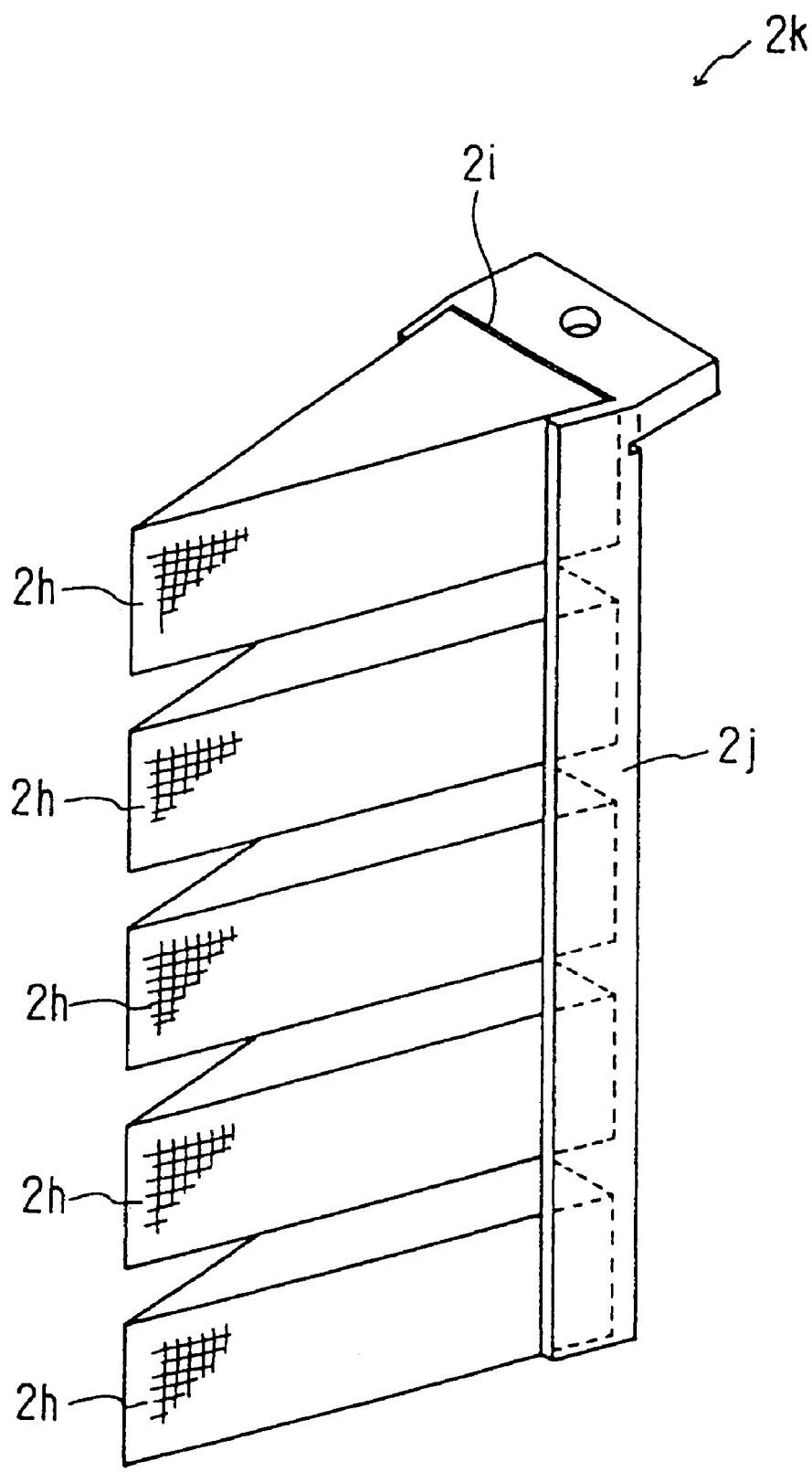
FIG. 10 is a perspective view of another water absorption member of the device for removing water drops from an umbrella in accordance with the first embodiment of the invention of this application.

As a variation of water absorption member, as shown in FIG. 9 and FIG. 10, a water absorption member is provided at the insertion space side with a number of notches in the longitudinal direction, consequently the absorption member lets the umbrella slide smoothly and enables easy absorption of the water drops from an umbrella. Water drops are to be absorbed easily by the notches 2m or section of the clearance portion during sliding of the umbrella owing to that notch 2m of the water absorption member 2k is cut deeply as shown in FIG. 9, or to that a number of water absorption members 2k in predetermined intervals in the vertical direction are arranged so as to form clearance of the same width as that of the notch 2k as shown in FIG. 10.

Furthermore, as another variation of the water absorption member, instead of the cloth 2h in the first embodiment, a special cloth on the back side of a nit with superior water absorbency, for example, a dappled nit structure and so forth of a polyester group fiber coated with acryl, urethane, or fluorine resin and so forth as a water proof coating is constructed so that the water proof coating surface covers the surface including the inclined portion 2d of the same elastic member 2c as the first embodiment so as to be touched with the elastic member 2c, water drops on the surface of umbrella k2 are absorbed by means of the nit of the special cloth when the rainy umbrella K, same as the first embodiment, is inserted into the clearance between the water absorption members 2k and slid upward and downward, and then absorbed water W is not moved owing to the water proof coating in the direction to the elastic member 2c, but owing to self gravity, water in the nit rapidly moves downward not to come back to umbrella cloth K2, but to be drained from the lower end of the nit.

At the same time, since each water absorption members is deformed and compressed during inserting and sliding of the umbrella, water in the nit is guided to move downward, and is squeezed from the lower end of the nit, thereby absorbency is not saturated with water, but certain absorbency is kept. Additionally water is not stored within absorption member, but resistance against inserting umbrella is lower.

Furthermore, as a variation, instead of a water absorption member of the first embodiment, a cloth can be used thereby water drops on the surface of umbrella K2 are removed from the umbrella cloth K2 in that water drops are carried by the waving surface of the cloth, the removed water W is not directed toward the elastic member 2c owing to the waterproof coating, and is moved along the surface of the cloth rapidly downward and drained without coming back to the umbrella cloth K2. Since any water absorption member is not used in the device, the property of removing water drops is not reduced, but is always kept at a certain level.

(The Second Embodiment)

Figure 11:
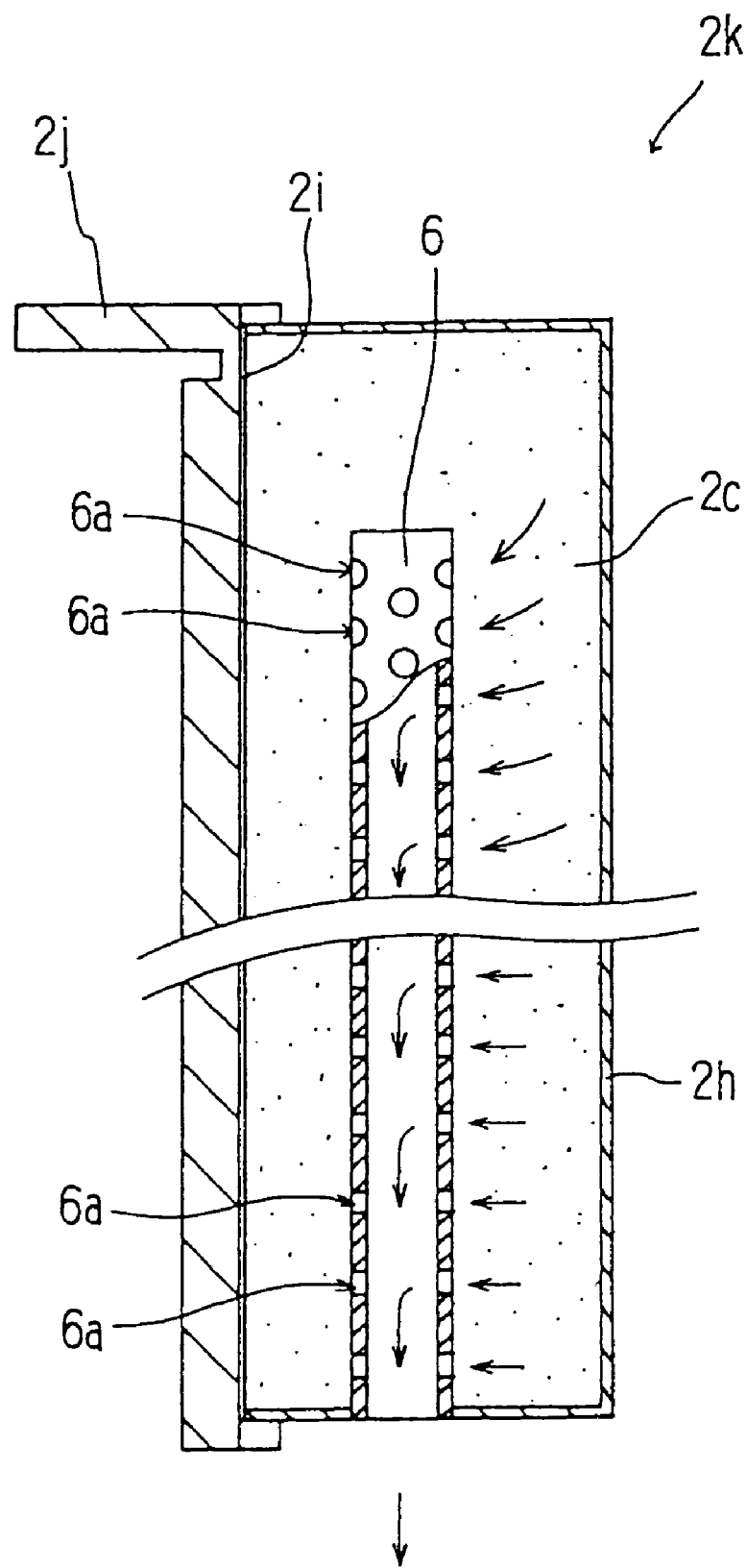
FIG. 11 is a longitudinal sectional view of the water absorption member of the device for removing water drops from an umbrella in accordance with the second embodiment of the invention of this application.
Figure 12:
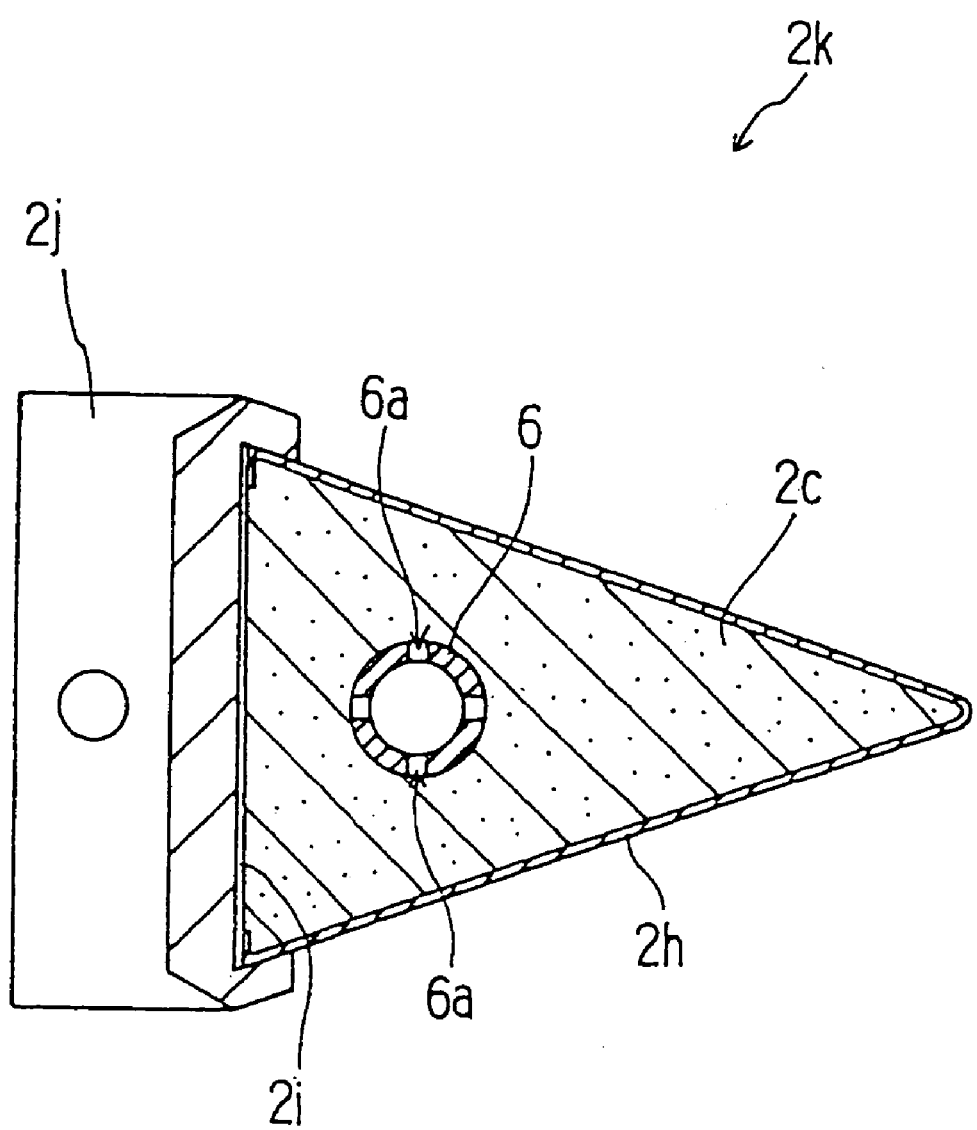
FIG. 12 is a lateral sectional view of the water absorption member of the device for removing water drops from an umbrella in accordance with the second embodiment of the invention of this application.

The device for removing water drops from the umbrella in accordance with the second embodiment of this invention is explained on the basis of FIG. 11 and FIG. 12. FIG. 11 is a longitudinal sectional view of a water absorption member of the device for removing water drops from an umbrella in accordance with the second embodiment of the invention of this application, and FIG. 12 is a lateral sectional view of the device for removing water drops from an umbrella in accordance with the second embodiment of the invention of this application.

As shown in each of the drawings, the device 1 for removing water drops from an umbrella in accordance with the second embodiment of the invention is different from the first embodiment in the point that a drainage pipe 6 with numerous bores 6a is disposed inside of the water absorption member 2k so that water absorption performance is increased.

Figure 13:
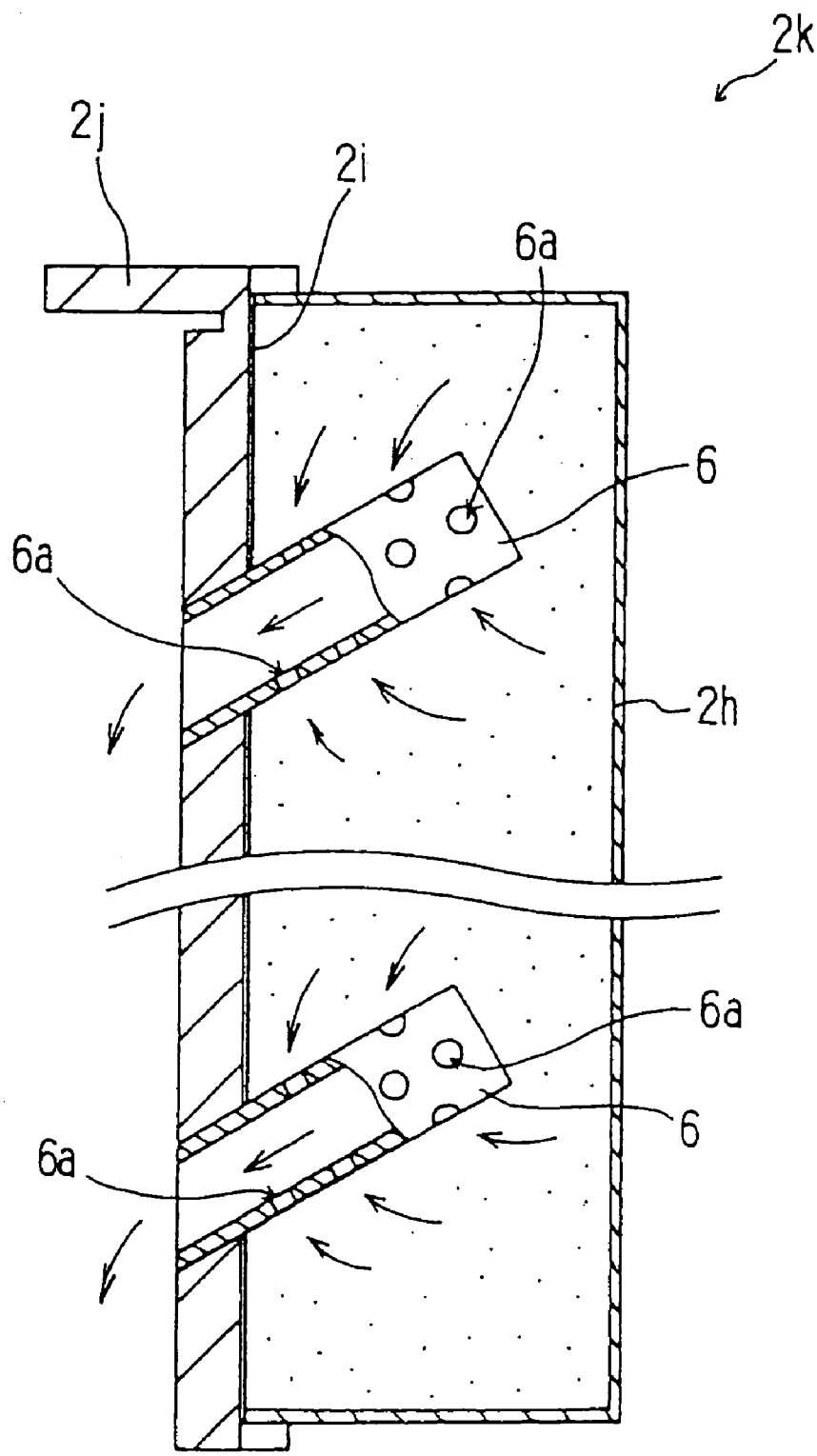
FIG. 13 is a longitudinal sectional view of the other water absorption member of the device for removing water drops in accordance with the second embodiment of the invention of this application.
Figure 14:
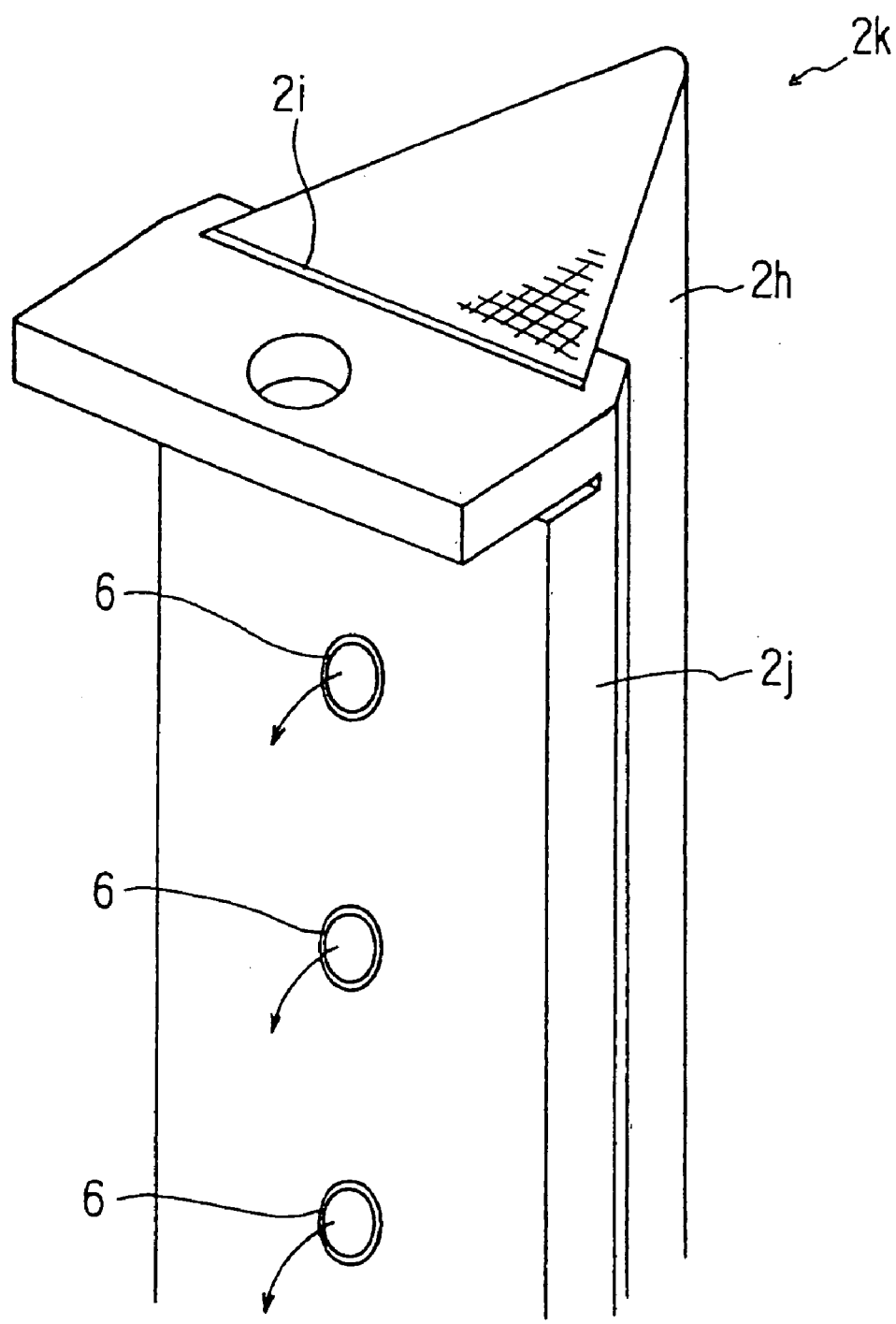
FIG. 14 is a perspective view of the other water absorption member of the device for removing water drops from an umbrella in accordance with the second embodiment of the invention of this application.

The drainage pipe 6 is disposed vertically and its lower end is exposed on the bottom surface of the elastic member 2c. Furthermore, this drainage pipe 6 is inclined about 20 degrees as shown in FIGS. 13 and 14 and the lower end of the drainage pipe is exposed outside of the installing member 2j, or the drainage pipe can be curved at its middle portion.

Next, the water absorption steps of the device for removing water drops from an umbrella in accordance with the second embodiment are explained. The water absorbed elastic member 2c is deformed during insertion of the next umbrella, and previously absorbed water is squeezed and gathered through the bores 6a in the drainage pipe, and is drained outside of the water absorption member 2k.

Accordingly since a water volume more than that in accordance with the first embodiment is squeezed outside of the water absorption member 2k, the water absorption performance is always kept at a high level.

(The Third Embodiment)

Figure 15:
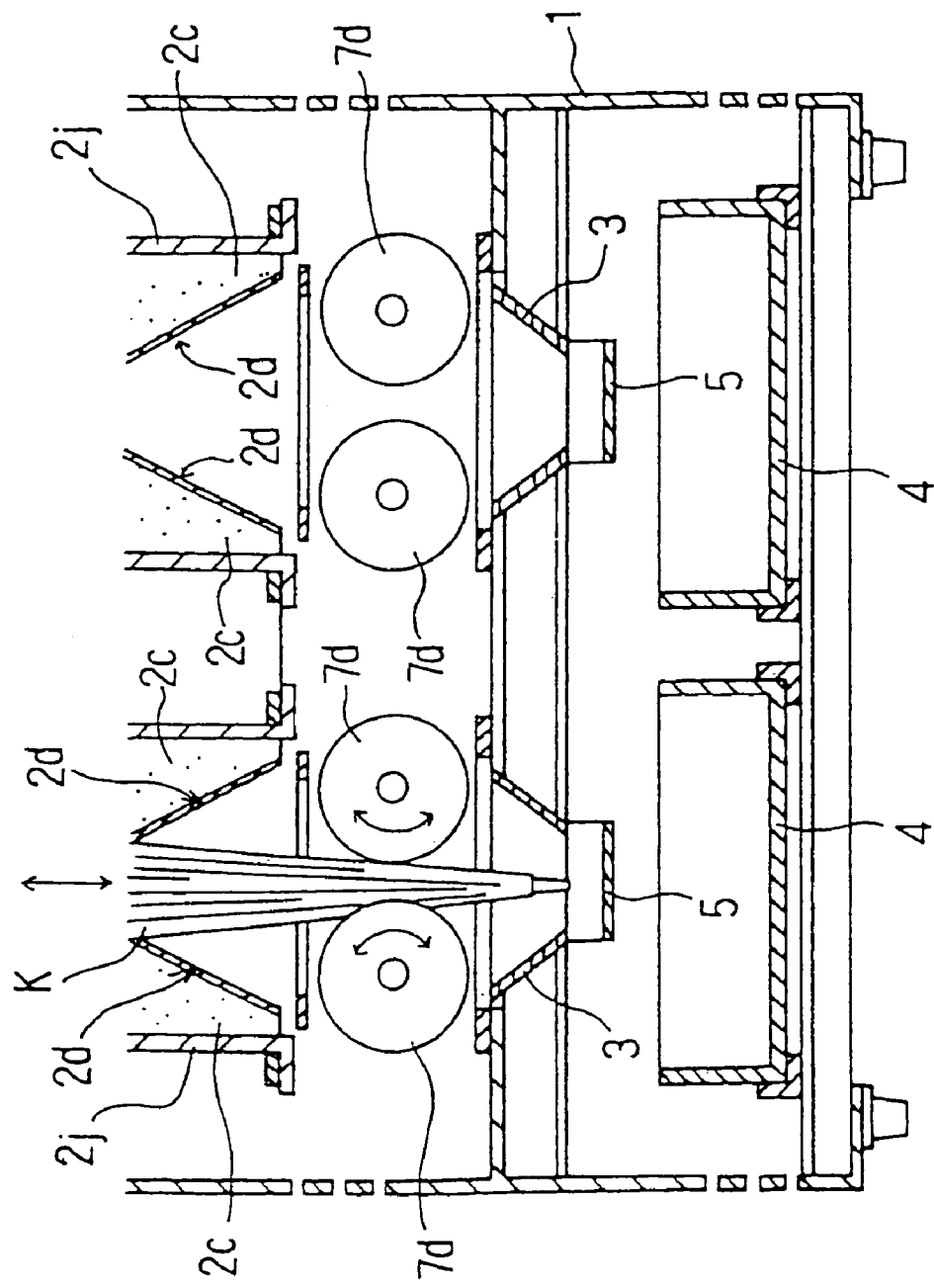
FIG. 15 is a sectional view of the essential part of the device for removing water drops from an umbrella in accordance with the second embodiment of the invention of this application.
Figure 16:
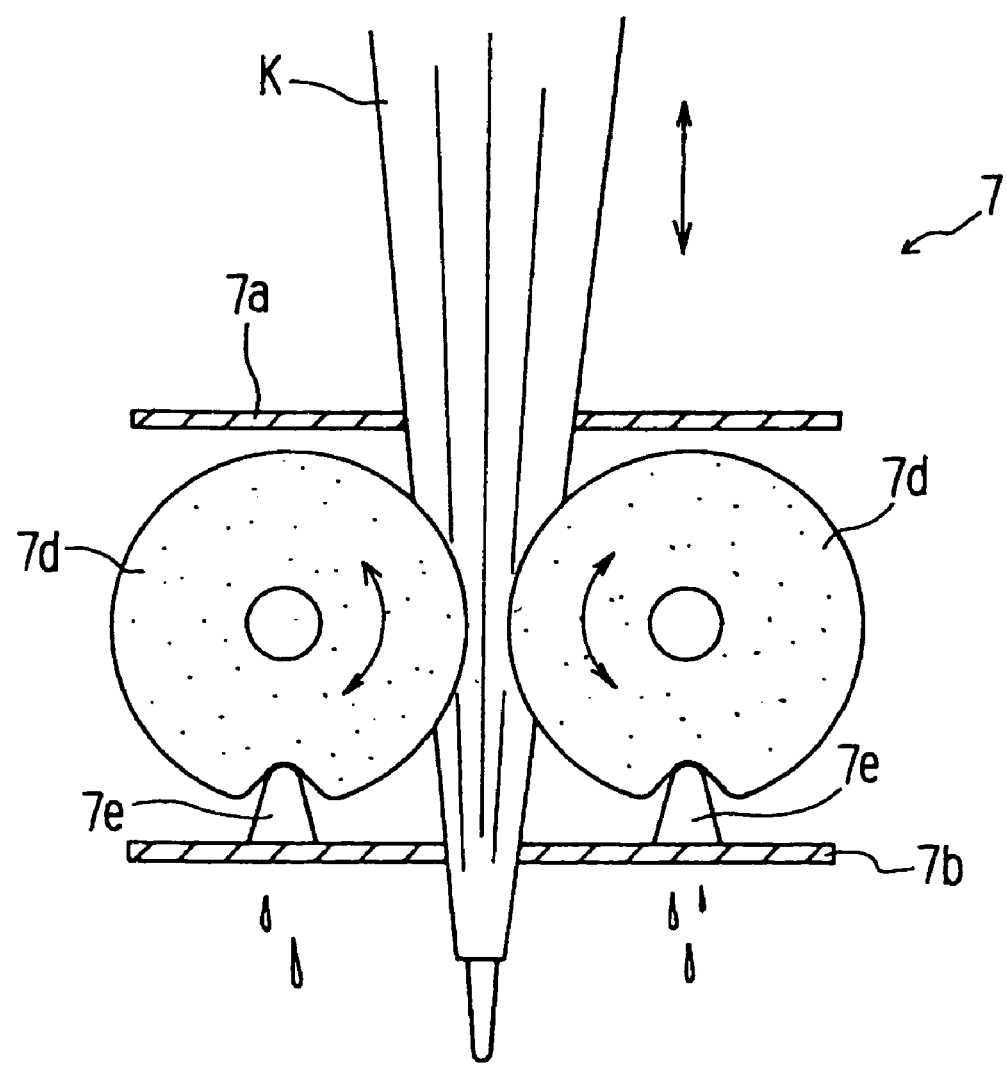
FIG. 16 is an illustration of the lower water absorption portion of the device for removing water drops from an umbrella in accordance with the third embodiment of the invention of this application.
Figure 17:
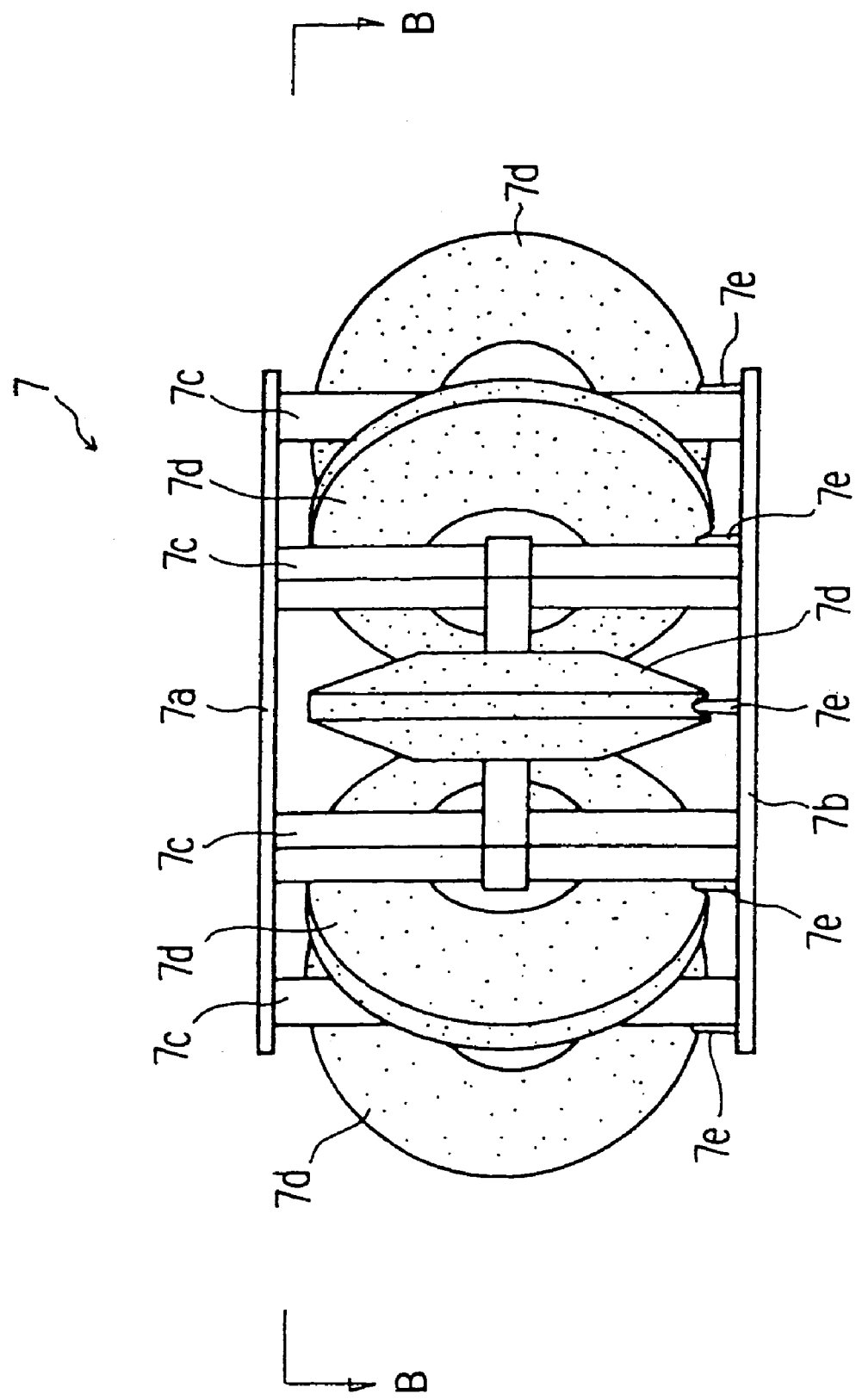
FIG. 17 is a side elevation of the lower water absorption portion of the device for removing water drops from an umbrella in accordance with the third embodiment of the invention of this application.
Figure 18:
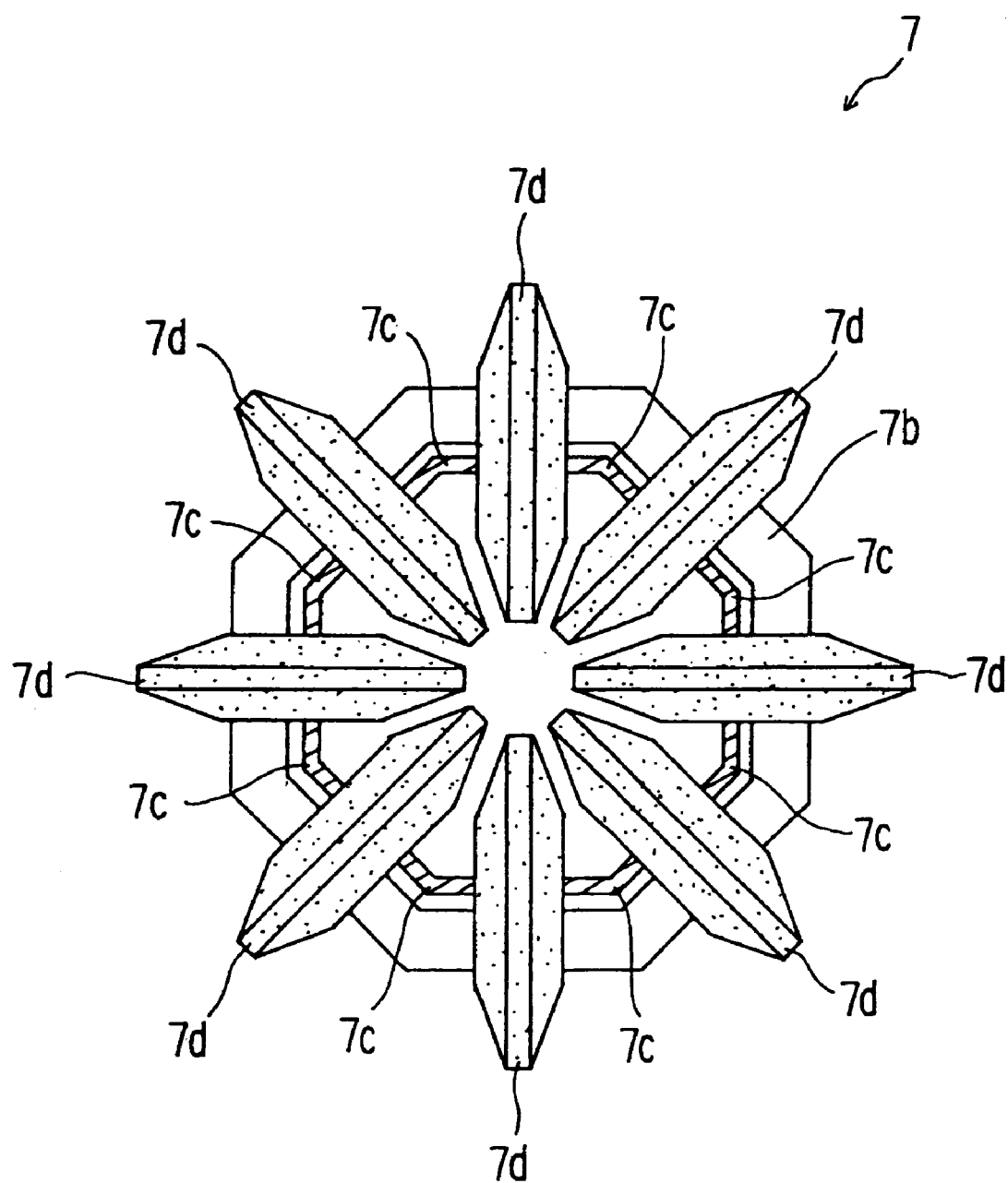
FIG. 18 is a sectional view looking along the line B—B in FIG. 17.

The device for removing water drops from an umbrella in accordance with the third embodiment of the invention of this application is explained on the basis of FIG. 15~FIG. 18. FIG. 15 is a sectional view of the parts of the device for removing water drops from an umbrella in accordance with the third embodiment of the invention, FIG. 16 is an illustration of a lower water absorption member of the device for removing water drops from an umbrella in accordance with the third embodiment of the invention, FIG. 17 is a side elevation of the lower water absorption portion of the device for removing water drops from an umbrella in accordance with the third embodiment of the invention, and FIG. 18 is a sectional view looking along line B—B in FIG. 17.

As shown in each of these drawings, the device for removing the water drops from an umbrella in accordance with the third embodiment of the invention is different from the first embodiment in that the lower water absorption part 7 consisting of water absorption rollers arranged radially is disposed at the lower portion of the water absorption part, so that water drops on the top area of the umbrella are to be removed surely.

The lower water absorption part 7 consists of an upper frame 7a, lower frame 7b, supporting columns 7c, water absorption rollers 7d of the same material as the elastic pillar 2c of the water absorption member 2k and press members 7e for squeezing water absorbed within the absorption rollers 7d. A number of water absorption rollers 7d are arranged rotationally so as to surround the inserted umbrella radially. Pushing members 7e are adapted to squeeze absorbed water by pushing the absorption rollers 7d always.

Next, the water absorption steps of the device for removing water drops from an umbrella in accordance with the third embodiment are explained. The top of umbrella contacts with each absorption roller 7d in the insertion space when the umbrella is inserted there, and water drops are absorbed through rotation of the absorption rollers. Each absorption roller 7d absorbs water and at the same time a pushing member 7e compresses and squeezes a portion of each absorption roller 7d, the pushing member 7e squeezes water absorbed in each absorption roller 7d, squeezed water is guided and gathered in the water pan 4 below the shoot 3. Therefore, in comparison with the first embodiment, the water absorption step is affected up to the top of the umbrella K which is difficult to touch with the water absorption members 2k, thereby high water absorption performance is effected.

(The Fourth Embodiment)

Figure 19:
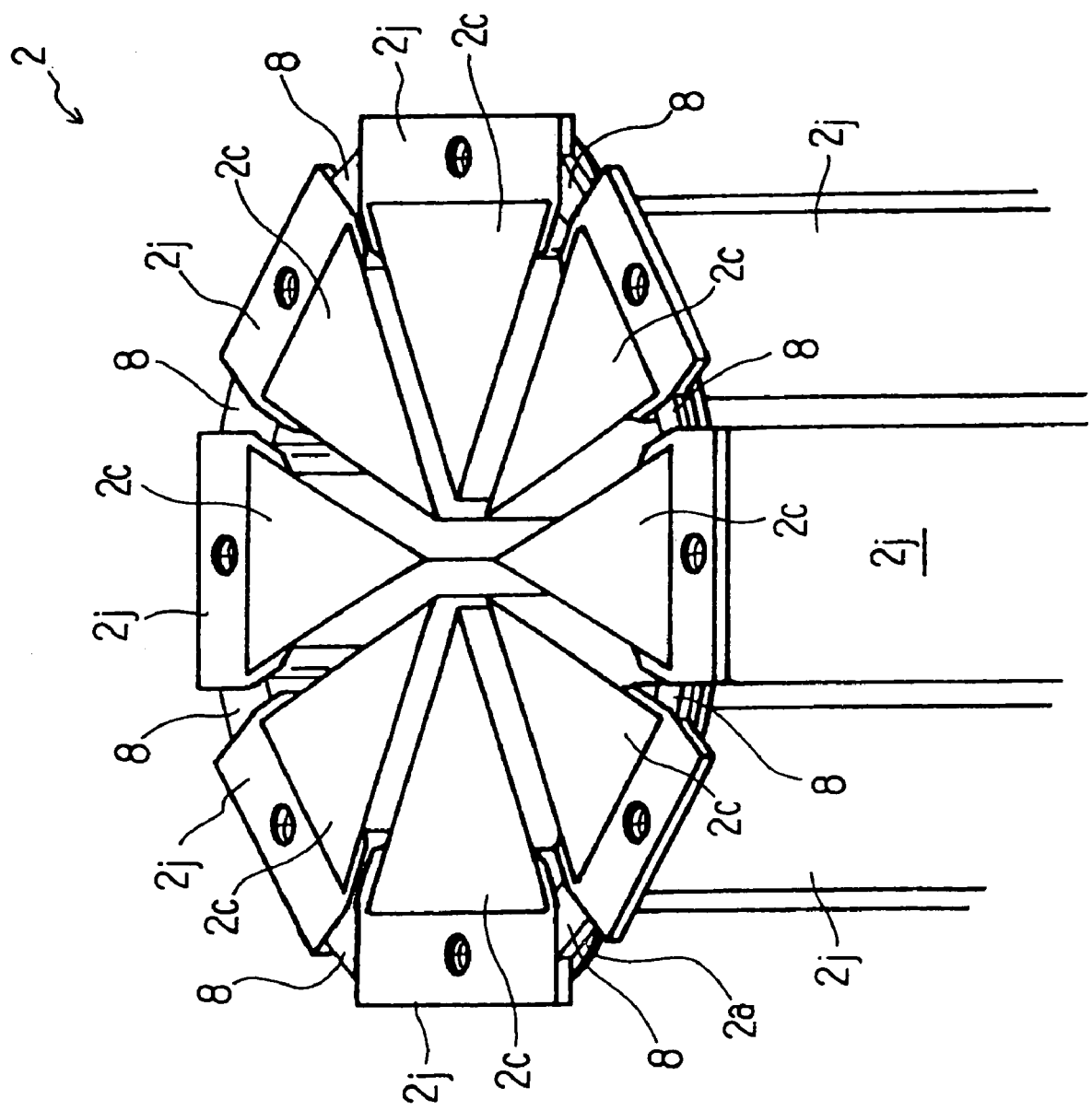
FIG. 19 is a perspective view of the water absorption portion of the device for removing water drops from an umbrella in accordance with the invention of this application.
Figure 20:
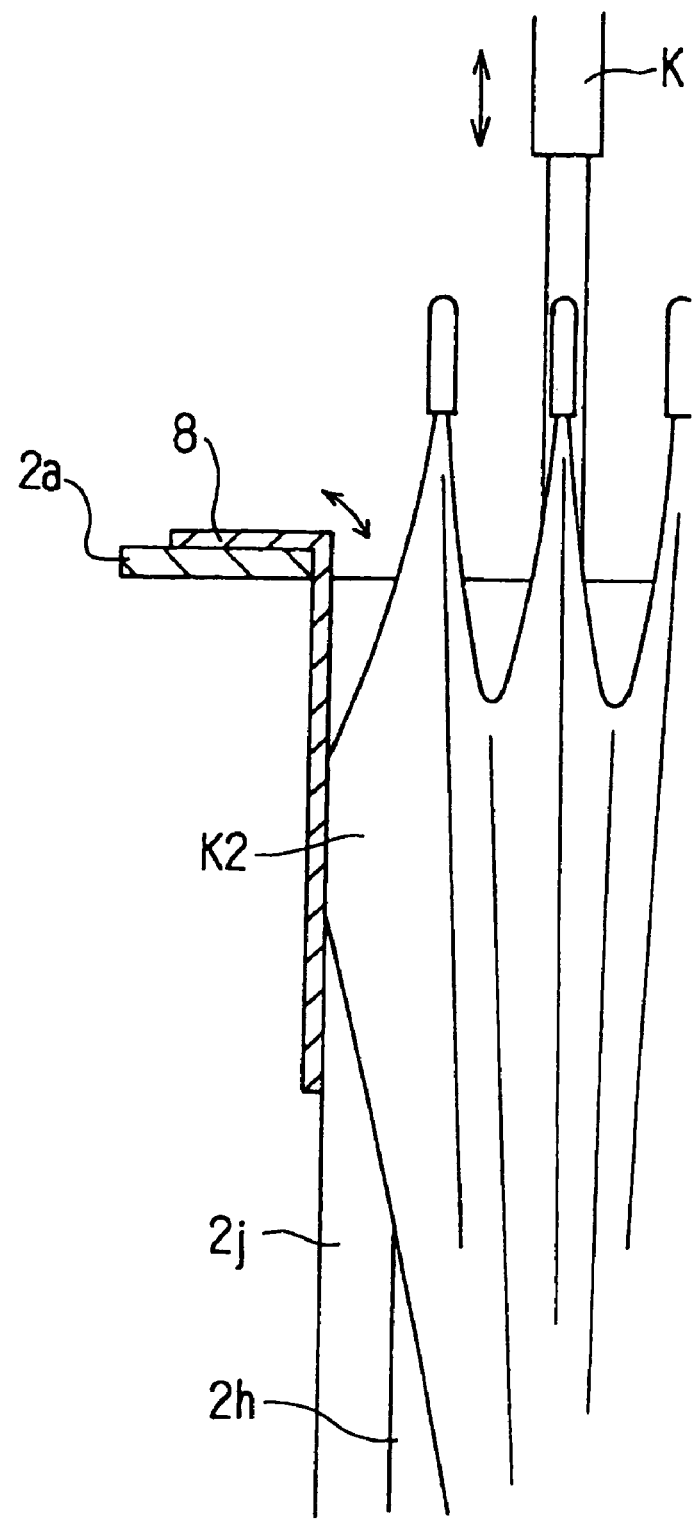
FIG. 20 is an illustration of the guide of the device for removing water drops from an umbrella in accordance with the forth embodiment of the invention of this application.

The device for removing water drops from an umbrella in accordance with the fourth embodiment of the invention of this application is explained on the basis of FIG. 19 and FIG. 20. FIG. 19 is a perspective view of the water absorption part of the device for removing the water drops from an umbrella in accordance with the fourth embodiment of the invention, and FIG. 20 is an illustration of a guide of the device for removing water drops from an umbrella in accordance with the fourth embodiment.

As shown in each drawing, the device 1 for removing water drops from an umbrella in accordance with the fourth embodiment is different from the first embodiment in that each L-formed guide 8 is installed to the upper frame 2a between the adjacent two water absorption members so that the umbrella cloth cannot be caught by the upper frame 2a when the umbrella is drawn out.

In the first embodiment through the third embodiment, the umbrella cloth inserted into the clearance between each water absorption member 2k during motion of the umbrella upward and downward can be caught, but in the fourth embodiment catching of umbrella is to be prevented in that the umbrella cloth is prevented to touch with the upper frame 2a by means of the L-formed guide 8. Therefore larger umbrellas can also slide smoothly and water drops can be effectively removed.

Furthermore, in the fourth embodiment catching of the umbrella is prevented by means of the guide 8, but besides as a variation of this embodiment, in stead of the upper frame 2a, the lower frame 2b, and the installing member 2j, an installing frame which is integrally formed with the upper frame 2a and lower frame 2b by connecting installing member 2j with each water absorption member 2k in the form of a cylinder is used commonly for each water absorption member 2k, consequently the umbrella can be moved smoothly as in the embodiments owing that the umbrella cloth does not project outside of the water absorption members and the cylindrical installing frame and the umbrella cloth can not be caught by anything inside of the device.

Furthermore, a cylindrical frame can be constructed such that the sectional area of the opening reduces downward gradually, each supported water absorption member 2k opposes each other at small intervals, therefore close contact of the surfaces of the water absorption member 2k with the whole umbrella with a shape tapering off toward the top of the umbrella is improved, so that efficiency of removing water drops can be increased. In this case, furthermore, the lower portion of reinforcement plate 2j on the outside of each absorption member 2k can be disclosed by cutting almost half of the installing frame and during insertion of the umbrella till its top, the lower portion of each water absorption member 2k is pushed toward the outer circumferential side during insertion of the umbrella and escapes outward owing to a lack of a frame therefore, the umbrella can be moved smoothly owing to reduction of frictional resistance between each crowded surface of the water absorption members and the umbrella surface. Since the lower portion of water absorption member 2k is adapted to move back toward its original position owing to elastic recovering force of reinforcement plate 2i when an outward pushing force of the water absorption member 2k is reduced through the upward motion of umbrella upward, close contact of water absorption member 2k with the umbrella is kept and removing performance of the water drops is not reduced.

Furthermore, in the first~the fourth embodiments, it is preferable to provide a number of notches at certain intervals which easily cause to deform the water absorption member 2k at the corner portion of each water absorption member contacting with the umbrella K.

(The Fifth Embodiment)

The foundation promotion system of a device for removing water drops from an umbrella in accordance with the fifth embodiment of the invention of this application is explained on the basis of FIG. 21~FIG. 28 as follows.

Figure 21:
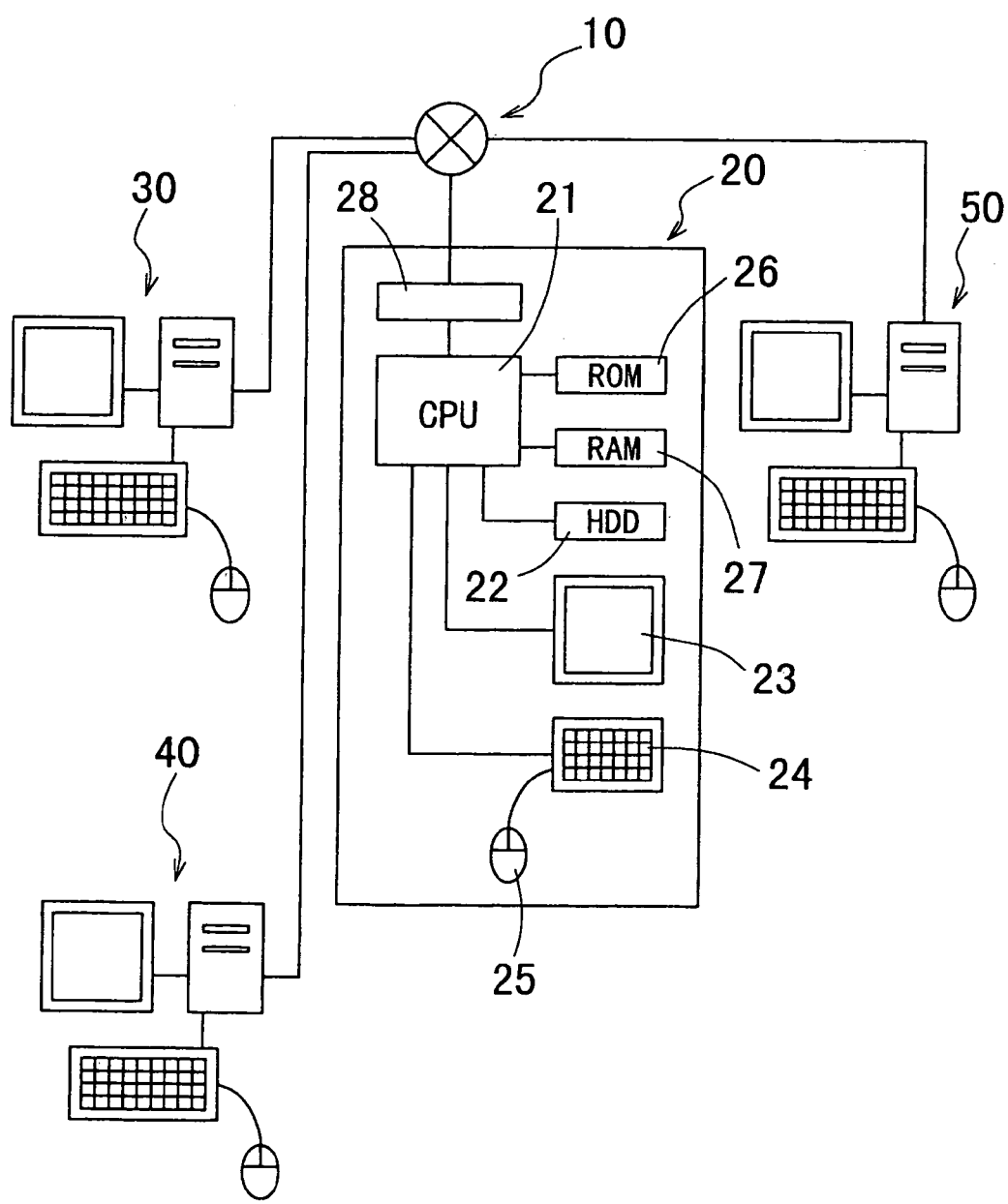
FIG. 21 is a view of a hardware construction of a foundation promotion system of the device for removing water drops from an umbrella in accordance with the fifth embodiment of the invention of this application.
Figure 22:
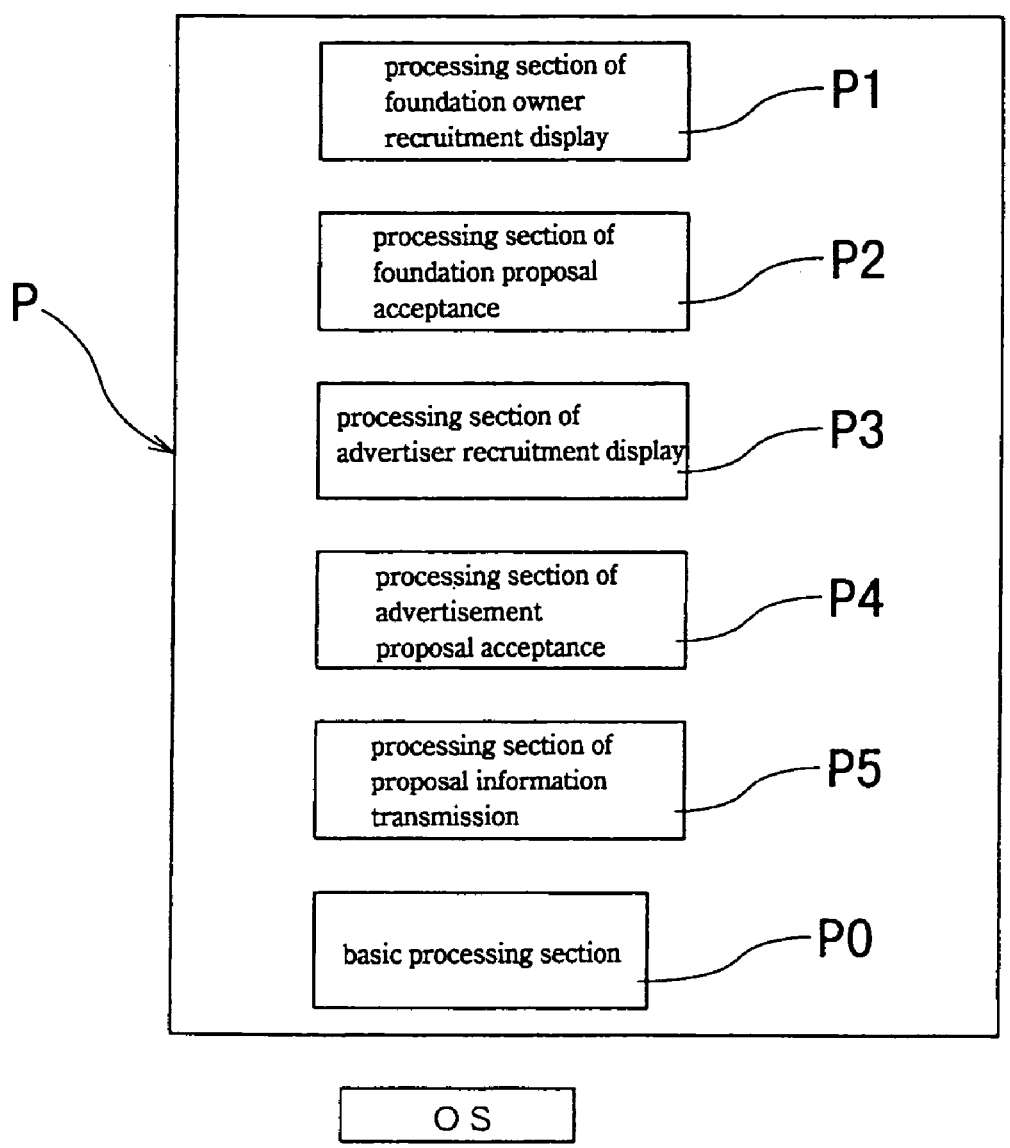
FIG. 22 is a view of a program software construction of the foundation promotion system of the device for removing water drops from an umbrella in accordance with the fifth embodiment of the invention of this application.
Figure 23:
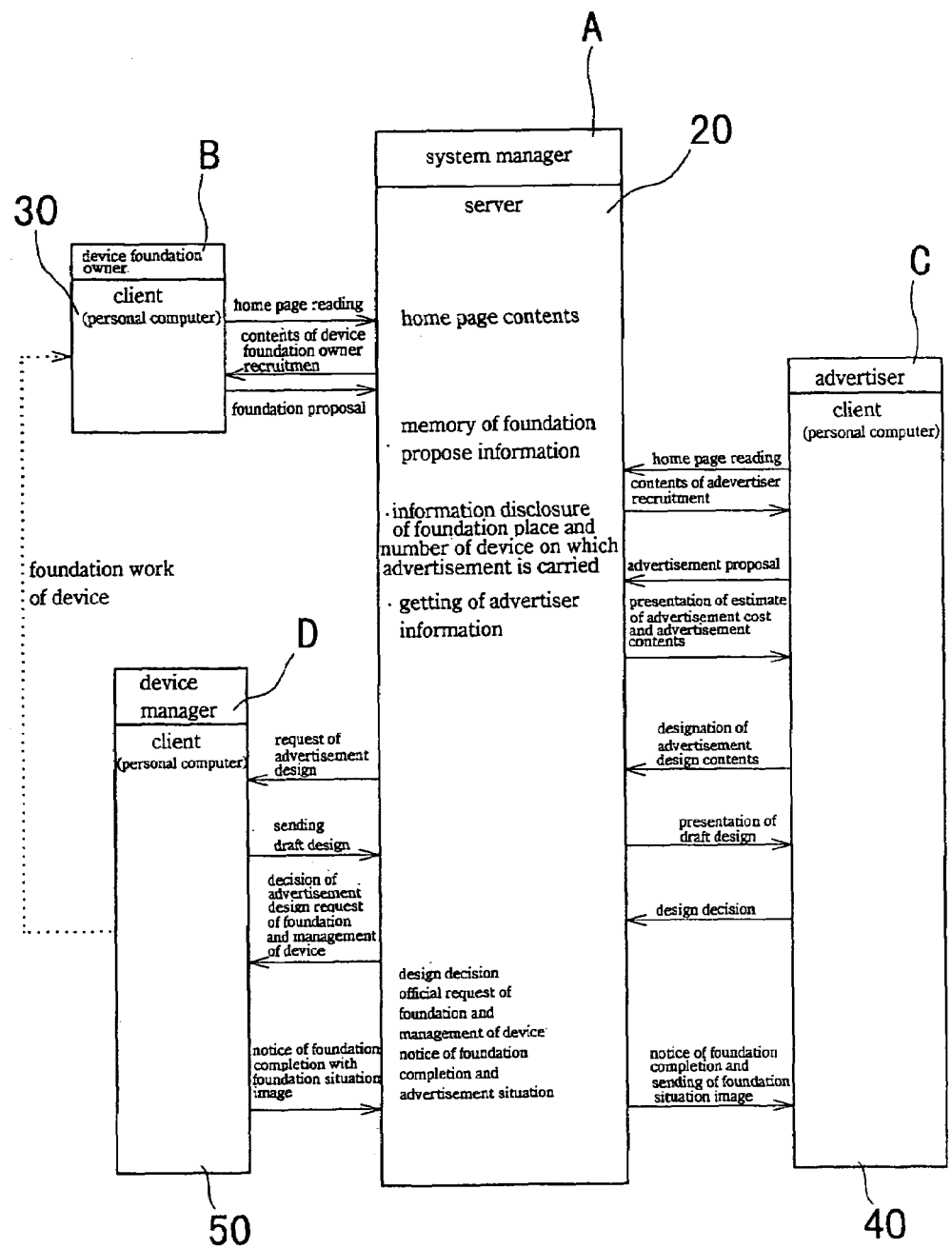
FIG. 23 is an illustration showing a communication sequence of the foundation promotion system of the device for removing water drops from an umbrella in accordance with the fifth embodiment of the invention of this application.
Figure 24:
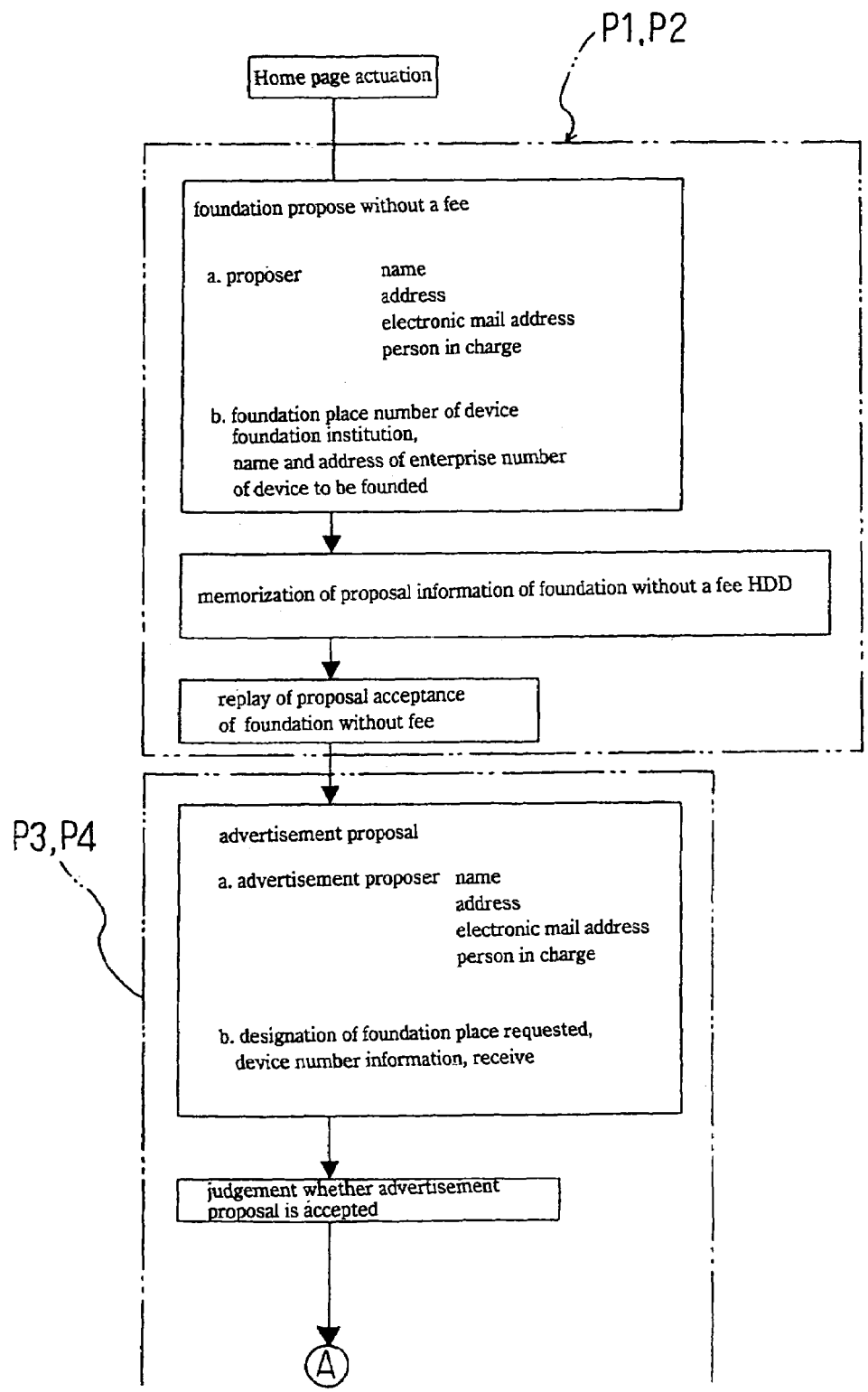
FIG. 24 is a front half of a flow chart of the program of the foundation promotion system of the device for removing water drops from an umbrella in accordance with the fifth embodiment of the invention of this application.
Figure 25:
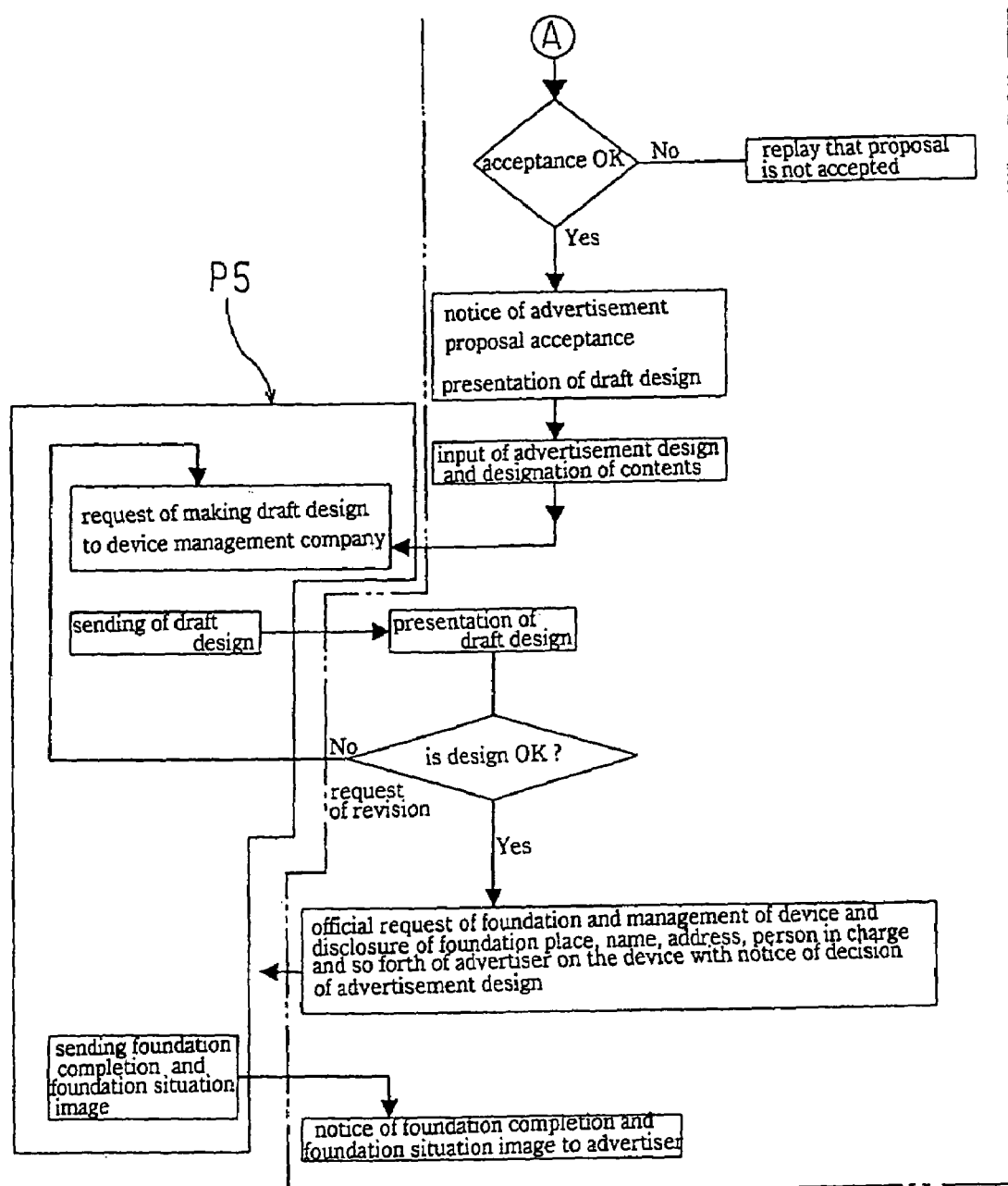
FIG. 25 is a back half of the flow chart of the program of the foundation promotion system of the device for removing water drops from an umbrella in accordance with fifth embodiment of the invention of this application.
Figure 28:
FIG. 28 is an illustration of the display screen of contents of an advertiser recruit on the home page of the foundation promotion system of the device for removing water drops from an umbrella in accordance with the fifth embodiment of the invention of this application.

FIG. 21 is an illustration of a hardware construction in a foundation promotion system of the device for removing water drops from an umbrella in accordance with the fifth embodiment, FIG. 22 is an illustration of a software program construction of a foundation promotion system of the device for removing water drops from an umbrella in accordance with the fifth embodiment, FIG. 23 is an illustration showing a communication process of a foundation promotion system of the device for removing water drops from an umbrella in accordance with the fifth embodiment, FIG. 24 is the first half flow chart of a program in a foundation promotion system of the device for removing water drops from an umbrella in accordance with the fifth embodiment, FIG. 25 is the second half flow chart of a program of a foundation promotion system of the device for removing water drops from an umbrella in accordance with the fifth embodiment, FIG. 26 is an illustration showing commercial transaction style of a foundation promotion system of the device for removing water drops from an umbrella in accordance with the fifth embodiment, FIG. 27 is an illustration showing contents of a foundation owner recruitment screen on the home page of foundation promotion system of the device for removing water drops from an umbrella in accordance with the fifth embodiment and FIG. 28 is an illustration showing contents of an advertiser recruitment screen on the home page of a foundation promotion system of the device for removing water drops from an umbrella in accordance with the fifth embodiment.

As shown in each drawing, a foundation promotion system in accordance with the fifth embodiment consists of a server 20 of a system manager A, a client 30 of a device foundation owner B who wants to found the device for removing water drops, a client 40 of an advertiser C who advertises on the device for removing water drops, and a client 50 of a device manager who really founds and offers maintenance for the device for removing water drops and the server A and the clients are connected to each other through a network such as the Internet and so forth.

The server 20 is a computer which offers an accessible home page and performs a program for various functions which accompany the home page, the computer is provided with CPU 21, HDD 22, a display 23, a keyboard 24, a mouse 25, ROM 26, RAM 27 and a network interface 28 and so forth.

The server 20 is a computer which performs a program P which consists of a basic processing section P0 which controls the home page, network communication, and interaction of electronic mail, a processing section P 1 of a foundation owner recruitment display, a processing section P 2 of a foundation proposal acceptance, a processing section P 3 of an advertiser recruitment display, a processing section P 4 of an advertisement proposal acceptance and a processing section P 5 of a proposal information transmission. Information retrieved from the server 20 is transmitted also to the person in charge of the system manager A on demand.

The clients 30, 40, 50 are computers which are connected through the device foundation owner B, the advertiser C, or the device manager D with a network 10 and the computers are personal computers by which the home pages can be red and can be able to interact by means of electronic mail.

Next, the processing steps of the foundation promotion system of the device for removing water drops from an umbrella in accordance with the fifth embodiment are explained. At first, the processing section P1 of the foundation owner recruitment is performed by means of the server 20, and the contents screen displaying that foundation of the device for removing water drops from an umbrella is recruited without a fee or with a low price is output on the home page disclosed in the network 10. In the output contents screen is displayed an input column and a proposal sending button S1, an information transmission to the server 20 side is adapted to be performed by inputting operation in the screen at the clients side.

The owner or manager (person, company or public party), of a building, a mansion public building and so forth who reads the contents of the foundation recruitment without a fee through the client 30 inputs a name, address, destination, foundation place, number of device to be founded and so forth in the input screen of the contents through the client 30 and clicks a foundation proposal transmission button S 1 when he wants to found the device as the device foundation owner B. Thereby, input information is sent, the processing section P 2 of foundation proposal acceptance is actuated in the server 20, and input information of a name, address, foundation place, telephone number and so forth of the proposer (device foundation owner B) is memorized in HDD22.

In succession, on the home page is displayed additionally the contents screen (FIG. 28) that advertisement to be carried on the device for removing water drops from an umbrella which the device foundation owner B intends to found is recruited by actuating processing section P 3 of an advertiser recruitment display of the server 20. On this contents screen, a foundation place, a foundation position, the number of devices to be founded of the device for removing water drops from an umbrella is displayed on the basis of the information sent from the device foundation owner B, and besides the input column and advertisement proposal sending button S 2 are displayed, thereby information sent to the server 20 side can be performed by an inputting operation of the contents screen on the client side.

The contents screen displaying advertisement recruitment is renewed through addition of the foundation place, foundation position, the number of devices to be founded of the device for removing water drops from an umbrella by actuating processing section P3 of the advertiser recruitment display of the server 20 every time when acceptance of proposal from a new device foundation owner B is renewed by the addition of information of foundation place, foundation position, the number of foundation devices and so forth of the device for removing water drops from an umbrella.

Any enterpriser who saw contents screen displaying advertisement recruitment on the home page through the client 40 inputs inputting items such as the electronic mail address, name, address, the number of devices to be founded and so forth through client 40 and clicks an advertisement proposal sending button S 2 when the enterpriser intends to advertise on the device for removing water drops in determined place.

Information is sent from the client 40 to the server 20 when the advertisement proposal sending button S2 is clicked, then the information from client 40 to the server 20 is sent, the processing section P 4 of advertisement proposal acceptance is actuated in the server 20, such proposal information as the mail address, name, address and so forth of the proposer (advertiser C) is memorized in HDD 22, while confirmation processing whether a mistake and so forth are contained, namely whether the contents of the advertisement proposal information is sufficient or not problematic is performed.

When the proposal contents from the advertiser is not problematic and received in the server 20 and combination between the foundation owner B who intends to found the device for removing water drops from an umbrella and the advertiser C who intends to advertise on the device for removing water drops from an umbrella is determined, reply of acceptance of proposal to the advertiser C, an estimate of advertisement cost, questions of contents of advertisement and so forth are sent as contents screen or electronic mail.

The server 20 deletes the contents in respect to the device for removing water drops or performs renewal processing addition of the display of the decision of the advertiser from the contents screen (refer to FIG. 28) displaying advertiser recruitment on the home page.

The advertiser C who received transmission information from the server through the client 40 replies designation contents in accordance with predetermined format in respect with advertisement design to advertise on the device for removing water drops from the client 40 to the server 20. The processing section P5 of proposal information transmission is actuated when the server 20 receives the design designation contents from the advertiser C, then information of an advertisement draft design of the device for removing water drops from an umbrella is sent together with the design designation contents from the device manager D to the client 50. Making of the draft design and sending and transmission of the draft design are repeated until the contents of ayes of the draft design from the advertiser C are replied.

The making of an advertisement draft design is affected on the basis of the information when the device manager D gets the information for making of advertisement design through the client 50, then an advertisement draft design is made on the basis of the information. The draft design is sent from the client 50 to the server 20, furthermore the information is sent from the server 20 to the client 40 of the advertiser C. The advertiser C who received the draft design sends information of ayes or nays of the draft design and the reason thereof and so forth from the client 40 to the server 20 when the advertiser C received the draft design. The making of the draft design and transmission and reply of the draft design are repeated until acceptance of the design draft is sent by the advertiser C.

The processing section of proposal information transmission is actuated when the server C received the information that draft design is acceptable from the client 40 of the advertiser C and advertisement design is decided, then such information as foundation place, detailed position, device foundation owner B, name, address, destination, name of person in charge and so forth of the advertiser C of device for removing water drops from an umbrella is transmitted to the client 50 of the device manager D.

The device manager D starts to make the advertisement in accordance with the decision of an advertisement draft design when the device manager D gets information of the decision of the advertisement draft design and the information of the device foundation through the client 50, then after the advertisement is made, the device manager D goes to the foundation place on the basis of the received information and founds the device for removing water drops. Furthermore, at the time of making of the advertisement design and performance of foundation of the device, it may be effected that the real person in charge of advertisement and the foundation manager of the device in charge of the device manager D may consult in detail directly with the device foundation owner B or advertiser C not through the system manager A, by using telephone, FAX, electronic mail and so forth directly.

The device manager D inputs a photographic image of the foundation situation in the client 50 when the device for removing water drops from an umbrella carried with an advertisement is founded in the place designated by the foundation owner B of the device, and an information notice with a photographic image of completion of device foundation is sent from the client 50 to the server 20.

This information of completion of device foundation together with photographic information is transmitted from the server 20 also to client 40 of the advertiser C. Furthermore, the server 20 transmits the information of completion of foundation of the device for removing water drops which is sent from device manager D also to the person in charge of system manager A, system manager A demands a fee to the advertiser C, while pays cost of foundation, making of advertisement, maintenance management and so forth to the device manager D. Furthermore, system manager A can display the photographic image as an example of conclusion on the home page under recognition by the foundation owner B of the device and advertiser C.

In accordance with the foundation promotion system of device for removing water drops from an umbrella of this embodiment, the communication among device foundation owner B, advertiser C and device manager D is adjusted and controlled; namely the server 20 which is managed by system manager A recruits effectively the device manager B who offers the foundation place of the device for removing water drops from an umbrella and the advertiser C who advertises on the device for removing water drops from an umbrella on the home page and offers necessary information preferably and rapidly to a device manager D who founds the device for removing waterdrop and takes maintenance and management of the device after foundation of the device thereby device manager B can get the device for removing water drops from an umbrella without any trouble and any costs, while the advertiser C can occupy a advertisement space at the position accessible for anyone near the gateway of the building and device manager B can introduce the device easily and carrying of advertisements by the advertiser C can be effected easily, promotion of foundation of the device for removing water drops from an umbrella is effected.

Furthermore, profits for the system manager A and the device manager D are to be achieved owing to foundation of the device for removing water drops from an umbrella, each taking part in foundation of the device for removing water drops from an umbrella has advantageous effects, thereby promotion of the device for removing water drops from an umbrella is effected and this comes to reduction of use of vinyl jacket to be trashed.

In the foundation promotion system in accordance with the embodiment, system manager A and device manager D who really handle the device are from different organizations, request is transmitted from the system manager A to device manager D, also the variation where the device manager D is system manager A and promotes foundation of the device for removing water drops positively by not only on the network, consequently he increases the device to be founded by increasing proposal of device owner B and advertiser C, income increases may attempted.

Industrial Use of Invention

The device of removing water drops from an umbrella in accordance with the invention of this application contrives reduction of waste of vinyl jackets which are prepared on the rainy day at the gateway of the building in that instead of vinyl jackets the device is provided which has simple construction and almost does not need such energy as electric energy and so forth, can absorb water simply and within short time, can keep water absorbency at a certain level, can remove water drops from an umbrella surely also after being uses many times and promotes reduction in the amount of vinyl jacket use.

Furthermore, system of foundation promotion of the device of removing water drops in accordance with the invention is acceptable for both managers of buildings, mansions, public institutions and so forth and advertisers can easily increase the number of foundation places of the device for removing water drops, and expense of vinyl jackets of umbrellas in accordance with the increase of the device for removing water drops is reduced, and consequently, unnecessary use of resources and an increase in amount of discharge of waste can be avoided.

What is claimed is:

1. Device for removing waterdrop of umbrella characterized in that a number of elastic water absorption members are so disposed radially in the opening for insertion of umbrella of the device body that clearances of predetermined pitches between each water absorption member are formed, spaces for insertion of umbrella are arranged radially in the center of a number of water absorption members, in the clearances between adjacent each water absorption member is inserted the umbrella cloth through inserting rainy umbrella into the umbrella insertion space, and waterdrops on the surface of umbrella cloth are adapted to be removed by sliding umbrella along the direction of insertion of umbrella among the water absorption members.

2. Device for removing waterdrop of umbrella described in claim 1 characterized in that each water absorption member is constructed by installing the elastic pillar with triangle in section consisting of foam material containing a numbers of continuous foams to hard reinforcement plate attachably and detachably.

3. Device for removing waterdrop of umbrella described in claim 1 characterized in that each water absorption member is constructed in the manner that the cloth of double construction having a knit on the front surface and a soft water transmittance sheet on the back surface covers the front surface of elastic pillar with triangle in section and each said elastic pillar is attached on the hard reinforcement plate.

4. Device for removing waterdrop of umbrella described in claim 1 characterized in that each water absorption member is constructed in the manner that the cloth material consisting of a knit water-proof coated on the back surface covers the surface of elastic member with triangle in section, and the same elastic member is attached to the hard reinforcement plate attachably and detachably.

5. Device for removing waterdrop of umbrella described in any one of claims 1–3 characterized in that the side lower portion of space for insertion of umbrella of the water absorption member is so formed inclined in the direction of back side of the water absorption member that interval of lower portion of space for insertion of the umbrella increases toward to the lower direction and absorbed water is adapted to be drained off in the lower direction without touching with the top end of the umbrella.

6. Device for removing waterdrop of umbrella described in any one of claims 1–3, characterized in that each radially arranged water absorption member is connected by a circular frame one another, and each water absorption member keeps water absorbency by preventing enlargement of clearance between each water absorption member at certain level.

7. Device for removing waterdrop of umbrella described in claim 6 characterized in that each guide portion for preventing umbrella from being caught by the circular frame is disposed when the umbrella inserted into the clearance between each water absorption member is to be withdrawn out.

8. Device for removing waterdrop of umbrella described in any one of claims 1–3, characterized in that at the corners of insertion space side of each water absorption member is formed a number of cut off portions with predetermined pitches in the direction of withdrawing of umbrella, each water absorption member is constructed deformably and thereby the umbrella is able to slide smoothly.

9. Device for removing waterdrop of umbrella described in any one of claims 1–3, characterized in that a water drainage pipe with a number of bores is so disposed in the water absorption member that the end of the water drainage pipe is adapted to be disclosed on the lower surface or on the back surface of the water absorption member, thereby absorbed water can be drained out of the absorption member by gathering absorbed water through said bores into the drainage pipes.

10. Device for removing waterdrop described in any one of claims 1–3, characterized in that a number of elastic water absorption rollers are so arranged radially below the water absorption member that the absorption rollers surround the inserted umbrella, pushing pieces are arranged so as to drain absorbed water by squeezing said water absorption rollers, and said rollers are adapted to absorb waterdrop and simultaneously to drain waterdrop in order to keep water absorbency constant.

11. Device for removing waterdrop of umbrella described in any one of claims 1–3, characterized in that a water pan for storing absorbed water is disposed below the water absorption member in the manner that the water pan for storing absorbed water is disposed to be able to take out and in the device body.

12. Device for removing waterdrop of umbrella described in claim 11 characterized in that a shoot for guiding absorbed water into the water pan is arranged over the water pan.

13. Foundation promotion system of device for removing waterdrop of umbrella characterized in that said system is constituted so as to provide a server who offers a service for making home page including predetermined contents through predetermined network readable and a number of clients who make said home page through said network readable, said system performs such program that the server is provided with a processing section of foundation owner recruitment which displays such contents on the home page as each content of explanation of foundation and enterprise management of device for removing waterdrop of umbrella with advertisement and foundation proposer recruitment of said device together with input column of foundation proposal information; a processing section of foundation proposal acceptance which receives and memories the foundation proposal information sent from the client of the foundation proposer through input information of foundation proposal information of said device; a processing section of advertiser recruitment which displays such contents on the home page as content that it recruits an advertiser who advertise on the device for removing waterdrop of umbrella which foundation proposer intends to found together with input column of advertisement proposal information; a processing section of advertisement proposal acceptance which receives and memories an advertisement proposal information sent from the client of advertiser through inputting into input column of said advertisement proposal information; a processing section of proposal information transmittance which sends necessary information for construction of foundation and management of the device for removing waterdrop of umbrella to the client of device manager who founds and manages said device for removing waterdrop of umbrella when foundation of said device for removing waterdrop of umbrella owing to foundation proposal of said device and advertisement proposal in accordance with said foundation proposal comes to be possible.

14. System for foundation promotion of device for removing waterdrop of umbrella, described in claim 13 characterized in that in step in processing section of said proposal information transmittance, in the information sent to device manager is contained each designation of advertisement draft design and making of advertisement on the outer surface of device for removing waterdrop of umbrella.

* * * * *